United States Patent
Seyama

(10) Patent No.: US 9,054,845 B2
(45) Date of Patent: Jun. 9, 2015

(54) RADIO COMMUNICATION APPARATUS AND SIGNAL PROCESSING METHOD

(71) Applicant: FUJITSU LIMITED, Kawasaki-shi, Kanagawa (JP)

(72) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 13/942,197

(22) Filed: Jul. 15, 2013

(65) Prior Publication Data
US 2014/0056390 A1 Feb. 27, 2014

(30) Foreign Application Priority Data
Aug. 21, 2012 (JP) ................................. 2012-182343

(51) Int. Cl.
H04L 27/06 (2006.01)
H04L 1/00 (2006.01)

(52) U.S. Cl.
CPC ............ *H04L 1/0054* (2013.01); *H04L 1/0048* (2013.01)

(58) Field of Classification Search
CPC .................................................. H04L 1/0054
USPC ......................................................... 375/341
See application file for complete search history.

(56) References Cited

U.S. PATENT DOCUMENTS

2009/0116590 A1* 5/2009 Lee et al. ........................ 375/341
2009/0232205 A1* 9/2009 Chiba ....................... 375/240.02

OTHER PUBLICATIONS

Kim, Kyeong Jin, et al., "Joint Channel Estimation and Data Detection Algorithms for MIMO-OFDM Systems," in Proc. Thirty-Sixth Asilomar Conference on Signals, Systems and Computers, pp. 1857-1861, Nov. 2002.
Higuchi, K. et al., "Adaptive Selection of Surviving Symbol Replica Candidates Based on Maximum Reliability in QRM-MLD for OFCDM MIMO Multiplexing," Proc. of IEEE Communications Society, Globecom 2004, pp. 2480-2486, Nov. 2004.
Higuchi, et al., "Adaptive Selection Algorithm of Surviving Symbol Replica Candidates in QRM-MLD for MIMO Multiplexing Using OFCDM Wireless Access," RCS2004-69, May 2004 (English Abstract).

\* cited by examiner

*Primary Examiner* — Lihong Yu
(74) *Attorney, Agent, or Firm* — Fujitsu Patent Center

(57) ABSTRACT

A radio communication apparatus includes a radio frequency unit that receives signals transmitted from a transmitter, and a baseband processor that obtains channel estimates based on the received signals and performs signal detection based on the channel estimates according to a QRM-MLD method. The baseband processor includes a stream separator that, in a first stage, detects a region to which a signal belongs, selects symbol candidates based on the detected region, and calculates metrics for the selected symbol candidates. In a second stage, the stream separator selects symbol candidates based on the metrics calculated for the symbol candidates selected in the first stage. After starting calculation of the metrics for the symbol candidates selected in a previous stage, the stream separator selects symbol candidates of a next stage based on metrics of surviving paths to which the symbol candidates whose metrics have been calculated belong.

10 Claims, 34 Drawing Sheets

FIG.7

| CUMULATIVE METRIC | $z'_{N-2}$ | REGION NUMBER | SURVIVING SYMBOL CANDIDATE NUMBER |
|---|---|---|---|
| 0.027 | (−0.389119, 0.249261) | 11 | 0 |
| 0.034 | (−0.353518, 0.295372) | 9 | 1 |
| 0.132 | (−0.296316, 0.108969) | 7 | 3 |
| ... | ... | ... | ... |
| 0.263 | (−0.199282, 0.135018) | 2 | 63 |

| CUMULATIVE METRIC | $z'_{N-k-1}$ | REGION NUMBER | SURVIVING SYMBOL CANDIDATE NUMBER |
|---|---|---|---|
| 0.156 | (0.4862, −0.8759) | | (0, 3, ..., 1) |
| 0.178 | (0.4276, −1.0973) | | (0, 3, ..., 2) |
| 0.229 | (0.1592, −0.7459) | | (1, 3, ..., 5) |
| ... | ... | ... | ... |
| 0.452 | (−0.4276, −0.5167) | | (2, 4, ..., 8) |

| REPRESENTATIVE METRIC | $z'_{N-k}$ | REGION NUMBER | CUMULATIVE METRIC UP TO PREVIOUS STAGE | SURVIVING SYMBOL CANDIDATE NUMBER | CURRENT RANK |
|---|---|---|---|---|---|
| 0.156 | (−0.320319, 0.22732) | 9 | 0.107 | (0, 3, .., 0) | 5 |
| 0.178 | (−0.223284, 0.253368) | 8 | 0.124 | (1, 3, .., 2) | 2 |
| 0.229 | (−0.199282, 0.135018) | 1 | 0.132 | (2, 4, .., 2) | 1 |
| ... | ... | ... | ... | ... | ... |
| 0.277 | (−0.296316, 0.108969) | 13 | 0.277 | (3, 1, .., 6) | 0 |

| REPRESENTATIVE METRIC | $z'_0$ | REGION NUMBER | CUMULATIVE METRIC UP TO PREVIOUS STAGE | SURVIVING SYMBOL CANDIDATE NUMBER | CURRENT RANK |
|---|---|---|---|---|---|
| 0.166 | (−0.0459, 1.064) | 14 | 0.107 | (0, 3, .., 0) | 3 |
| 0.198 | (1.0464, −0.7459) | 43 | 0.124 | (1, 3, .., 2) | 3 |
| 0.233 | (−0.5092, 0.4986) | 1 | 0.132 | (2, 4, .., 2) | 2 |
| ... | ... | ... | ... | ... | ... |
| 0.532 | (−0.6749, 0.0498) | 22 | 0.277 | (3, 1,..., 6) | 0 |

FIG.23

| REGION NUMBER | RANKING | | | |
|---|---|---|---|---|
| | 0 | 1 | 2 | 3 |
| 0 | 0 | 1 | 2 | 3 |
| 1 | 1 | 0 | 3 | 2 |
| 2 | 2 | 0 | 3 | 1 |
| 3 | 3 | 1 | 2 | 0 |

FIG.25

| REGION NUMBER | RANKING | | | |
|---|---|---|---|---|
| | 0 | 1 | 2 | 3 |
| 0 | 0 | 1 | 2 | 3 |
| 1 | 0 | 1 | 2 | 3 |
| 2 | 0 | 2 | 1 | 3 |
| 3 | 0 | 1 | 2 | 3 |
| 4 | 1 | 0 | 3 | 2 |
| 5 | 1 | 0 | 3 | 2 |
| 6 | 1 | 0 | 3 | 2 |
| 7 | 1 | 3 | 0 | 2 |
| 8 | 2 | 0 | 3 | 1 |
| 9 | 2 | 0 | 3 | 1 |
| 10 | 2 | 0 | 3 | 1 |
| 11 | 2 | 3 | 0 | 1 |
| 12 | 3 | 2 | 1 | 0 |
| 13 | 3 | 1 | 2 | 0 |
| 14 | 3 | 2 | 1 | 0 |
| 15 | 3 | 2 | 1 | 0 |

FIG.27

| REGION NUMBER | RANKING | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 3 | 2 | 1 | 0 | 6 | 9 | 8 | 4 | 12 | 11 | 7 | 5 | 10 | 13 | 14 | 15 |
| 1 | 2 | 0 | 3 | 6 | 4 | 1 | 7 | 8 | 5 | 9 | 12 | 13 | 10 | 11 | 14 | 15 |
| 2 | 1 | 0 | 3 | 9 | 8 | 2 | 4 | 11 | 10 | 6 | 12 | 14 | 5 | 7 | 13 | 15 |
| 3 | 0 | 1 | 2 | 4 | 8 | 6 | 3 | 9 | 12 | 10 | 5 | 11 | 7 | 13 | 14 | 15 |
| 4 | 6 | 4 | 7 | 2 | 0 | 5 | 3 | 12 | 8 | 1 | 13 | 9 | 14 | 15 | 10 | 11 |
| 5 | 7 | 6 | 5 | 4 | 2 | 13 | 12 | 0 | 8 | 3 | 15 | 14 | 1 | 9 | 10 | 11 |
| 6 | 4 | 5 | 6 | 0 | 12 | 7 | 2 | 13 | 8 | 1 | 14 | 3 | 9 | 10 | 15 | 11 |
| 7 | 5 | 4 | 7 | 13 | 12 | 6 | 0 | 15 | 8 | 14 | 2 | 10 | 1 | 3 | 9 | 7 |
| 8 | 9 | 8 | 11 | 1 | 10 | 0 | 3 | 12 | 4 | 2 | 14 | 6 | 13 | 15 | 5 | 7 |
| 9 | 8 | 9 | 10 | 0 | 12 | 11 | 1 | 14 | 4 | 13 | 2 | 5 | 6 | 3 | 15 | 7 |
| 10 | 11 | 10 | 9 | 8 | 1 | 14 | 12 | 0 | 4 | 3 | 15 | 2 | 13 | 5 | 9 | 7 |
| 11 | 10 | 8 | 11 | 14 | 12 | 9 | 0 | 15 | 13 | 4 | 1 | 5 | 2 | 3 | 6 | 3 |
| 12 | 12 | 13 | 14 | 8 | 4 | 10 | 5 | 15 | 0 | 9 | 6 | 2 | 1 | 7 | 11 | 3 |
| 13 | 13 | 12 | 15 | 5 | 14 | 4 | 7 | 8 | 6 | 10 | 0 | 2 | 9 | 11 | 1 | 3 |
| 14 | 14 | 12 | 15 | 10 | 8 | 13 | 4 | 11 | 5 | 0 | 9 | 1 | 6 | 7 | 2 | 3 |
| 15 | 15 | 14 | 13 | 12 | 5 | 10 | 8 | 4 | 0 | 7 | 11 | 6 | 9 | 1 | 2 | 3 |

FIG.29

| REGION NUMBER | RANKING | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 3 | 2 | 1 | 0 | 6 | 9 | 8 | 4 | 12 | 11 | 7 | 5 | 10 | 13 | 14 | 15 |
| 1 | 3 | 2 | 1 | 0 | 6 | 4 | 9 | 8 | 7 | 12 | 5 | 11 | 10 | 13 | 14 | 15 |
| 2 | 3 | 1 | 2 | 0 | 9 | 8 | 6 | 4 | 11 | 12 | 10 | 7 | 5 | 14 | 13 | 15 |
| 3 | 3 | 2 | 1 | 0 | 6 | 9 | 8 | 4 | 12 | 11 | 7 | 5 | 10 | 13 | 14 | 15 |
| 4 | 2 | 3 | 0 | 6 | 1 | 4 | 7 | 8 | 9 | 5 | 12 | 13 | 10 | 11 | 14 | 15 |
| 5 | 2 | 6 | 3 | 0 | 4 | 1 | 7 | 5 | 8 | 12 | 9 | 13 | 10 | 14 | 11 | 15 |
| 6 | 2 | 0 | 3 | 1 | 6 | 4 | 8 | 9 | 12 | 7 | 5 | 10 | 11 | 13 | 14 | 15 |
| 7 | 2 | 0 | 6 | 4 | 3 | 1 | 8 | 7 | 5 | 12 | 9 | 13 | 10 | 14 | 11 | 15 |
| 8 | 1 | 3 | 0 | 9 | 2 | 8 | 4 | 11 | 6 | 10 | 12 | 14 | 5 | 7 | 13 | 15 |
| 9 | 1 | 0 | 3 | 2 | 9 | 8 | 4 | 6 | 12 | 11 | 10 | 5 | 7 | 14 | 13 | 15 |
| 10 | 1 | 9 | 3 | 0 | 8 | 2 | 11 | 10 | 4 | 12 | 6 | 14 | 5 | 13 | 7 | 15 |
| 11 | 1 | 0 | 9 | 8 | 3 | 2 | 4 | 11 | 10 | 12 | 6 | 14 | 5 | 13 | 7 | 15 |
| 12 | 0 | 1 | 2 | 3 | 4 | 8 | 6 | 9 | 12 | 10 | 5 | 11 | 7 | 13 | 14 | 15 |
| 13 | 0 | 2 | 4 | 6 | 1 | 8 | 3 | 12 | 9 | 5 | 7 | 13 | 10 | 14 | 11 | 15 |
| 14 | 0 | 1 | 8 | 9 | 2 | 4 | 3 | 12 | 10 | 6 | 11 | 14 | 5 | 13 | 7 | 15 |
| 15 | 0 | 4 | 8 | 12 | 2 | 1 | 9 | 6 | 3 | 10 | 5 | 13 | 14 | 11 | 7 | 15 |
| 16 | 6 | 2 | 7 | 4 | 0 | 3 | 5 | 1 | 12 | 8 | 13 | 9 | 14 | 10 | 15 | 11 |
| 17 | 6 | 7 | 2 | 4 | 5 | 0 | 3 | 12 | 13 | 1 | 8 | 9 | 14 | 15 | 10 | 11 |
| 18 | 6 | 4 | 2 | 0 | 7 | 5 | 12 | 3 | 8 | 1 | 13 | 9 | 14 | 10 | 15 | 11 |
| 19 | 6 | 4 | 7 | 5 | 2 | 0 | 12 | 13 | 8 | 3 | 1 | 14 | 9 | 15 | 10 | 11 |
| 20 | 7 | 6 | 5 | 4 | 2 | 0 | 13 | 12 | 3 | 8 | 1 | 15 | 14 | 9 | 10 | 11 |
| 21 | 7 | 6 | 5 | 4 | 2 | 13 | 12 | 0 | 8 | 3 | 15 | 14 | 1 | 9 | 10 | 11 |
| 22 | 7 | 6 | 5 | 4 | 2 | 13 | 12 | 0 | 8 | 3 | 15 | 14 | 1 | 9 | 10 | 11 |
| 23 | 7 | 5 | 6 | 4 | 13 | 12 | 2 | 0 | 15 | 8 | 14 | 3 | 1 | 10 | 9 | 11 |
| 24 | 4 | 0 | 6 | 2 | 5 | 12 | 8 | 7 | 1 | 13 | 3 | 9 | 14 | 10 | 15 | 11 |
| 25 | 4 | 5 | 6 | 7 | 0 | 12 | 2 | 13 | 8 | 1 | 14 | 3 | 15 | 9 | 10 | 11 |
| 26 | 4 | 0 | 12 | 8 | 5 | 6 | 2 | 13 | 7 | 1 | 14 | 10 | 9 | 3 | 15 | 11 |
| 27 | 4 | 5 | 12 | 13 | 6 | 0 | 7 | 8 | 2 | 14 | 15 | 10 | 1 | 9 | 3 | 11 |
| 28 | 5 | 4 | 7 | 6 | 13 | 12 | 0 | 2 | 8 | 15 | 14 | 1 | 3 | 10 | 9 | 11 |
| 29 | 5 | 7 | 4 | 13 | 6 | 12 | 0 | 15 | 2 | 14 | 8 | 10 | 1 | 3 | 9 | 11 |
| 30 | 5 | 4 | 13 | 12 | 7 | 6 | 0 | 15 | 14 | 8 | 2 | 10 | 1 | 9 | 3 | 11 |
| 31 | 5 | 13 | 7 | 4 | 12 | 6 | 15 | 14 | 0 | 8 | 2 | 10 | 1 | 9 | 3 | 11 |
| 32 | 9 | 1 | 11 | 8 | 0 | 10 | 3 | 2 | 12 | 4 | 14 | 6 | 13 | 5 | 15 | 7 |
| 33 | 9 | 8 | 1 | 0 | 11 | 10 | 12 | 3 | 4 | 2 | 14 | 6 | 13 | 5 | 15 | 7 |
| 34 | 9 | 11 | 1 | 8 | 10 | 0 | 3 | 12 | 14 | 2 | 4 | 6 | 13 | 15 | 5 | 7 |
| 35 | 9 | 8 | 11 | 10 | 1 | 0 | 12 | 14 | 4 | 3 | 2 | 13 | 6 | 15 | 5 | 7 |
| 36 | 8 | 0 | 9 | 1 | 10 | 12 | 11 | 4 | 2 | 14 | 3 | 6 | 13 | 5 | 15 | 7 |
| 37 | 8 | 0 | 12 | 4 | 10 | 9 | 1 | 14 | 11 | 13 | 2 | 6 | 5 | 3 | 15 | 7 |
| 38 | 8 | 9 | 10 | 11 | 0 | 12 | 1 | 14 | 4 | 13 | 2 | 3 | 15 | 5 | 6 | 7 |
| 39 | 8 | 10 | 12 | 14 | 9 | 0 | 4 | 11 | 13 | 1 | 15 | 5 | 2 | 6 | 3 | 7 |
| 40 | 11 | 9 | 10 | 8 | 1 | 0 | 14 | 12 | 3 | 4 | 2 | 15 | 13 | 6 | 5 | 7 |
| 41 | 11 | 10 | 9 | 8 | 1 | 14 | 12 | 0 | 4 | 3 | 15 | 2 | 13 | 5 | 6 | 7 |
| 42 | 11 | 10 | 9 | 8 | 1 | 14 | 12 | 0 | 4 | 3 | 15 | 2 | 13 | 5 | 6 | 7 |
| 43 | 11 | 10 | 9 | 8 | 14 | 12 | 1 | 0 | 15 | 4 | 13 | 3 | 2 | 5 | 6 | 7 |
| 44 | 10 | 8 | 11 | 9 | 14 | 12 | 0 | 1 | 4 | 15 | 13 | 2 | 3 | 5 | 6 | 7 |
| 45 | 10 | 8 | 14 | 12 | 11 | 9 | 0 | 15 | 4 | 13 | 1 | 5 | 2 | 6 | 3 | 7 |
| 46 | 10 | 11 | 8 | 14 | 9 | 12 | 0 | 15 | 1 | 4 | 13 | 5 | 2 | 3 | 6 | 7 |
| 47 | 10 | 14 | 11 | 8 | 12 | 9 | 15 | 13 | 0 | 4 | 1 | 5 | 2 | 6 | 3 | 7 |
| 48 | 12 | 8 | 4 | 0 | 13 | 14 | 10 | 5 | 15 | 9 | 6 | 1 | 2 | 7 | 11 | 3 |
| 49 | 12 | 4 | 13 | 5 | 14 | 8 | 0 | 15 | 6 | 10 | 7 | 2 | 9 | 1 | 11 | 3 |
| 50 | 12 | 8 | 14 | 10 | 13 | 4 | 0 | 15 | 9 | 5 | 11 | 1 | 6 | 2 | 7 | 3 |
| 51 | 12 | 13 | 14 | 15 | 4 | 8 | 5 | 10 | 0 | 9 | 6 | 7 | 11 | 1 | 2 | 3 |
| 52 | 13 | 12 | 5 | 4 | 15 | 14 | 8 | 7 | 0 | 6 | 10 | 2 | 9 | 1 | 11 | 3 |
| 53 | 13 | 5 | 15 | 12 | 4 | 14 | 7 | 6 | 8 | 0 | 10 | 2 | 9 | 1 | 11 | 3 |
| 54 | 13 | 12 | 15 | 14 | 5 | 4 | 8 | 10 | 0 | 7 | 6 | 9 | 2 | 11 | 1 | 3 |
| 55 | 13 | 15 | 5 | 12 | 14 | 4 | 7 | 8 | 10 | 6 | 0 | 2 | 9 | 11 | 1 | 3 |
| 56 | 14 | 12 | 10 | 8 | 15 | 13 | 4 | 11 | 0 | 9 | 5 | 1 | 6 | 2 | 7 | 3 |
| 57 | 14 | 12 | 15 | 13 | 10 | 8 | 4 | 5 | 0 | 11 | 9 | 6 | 1 | 7 | 2 | 3 |
| 58 | 14 | 10 | 15 | 12 | 8 | 11 | 13 | 9 | 4 | 0 | 5 | 1 | 6 | 2 | 7 | 3 |
| 59 | 14 | 15 | 10 | 12 | 13 | 8 | 4 | 11 | 5 | 0 | 9 | 1 | 6 | 7 | 2 | 3 |
| 60 | 15 | 14 | 13 | 12 | 5 | 10 | 8 | 4 | 0 | 7 | 11 | 6 | 9 | 1 | 2 | 3 |
| 61 | 15 | 13 | 14 | 12 | 5 | 4 | 10 | 8 | 7 | 0 | 6 | 11 | 9 | 2 | 1 | 3 |
| 62 | 15 | 14 | 13 | 12 | 10 | 8 | 5 | 4 | 11 | 0 | 9 | 7 | 6 | 1 | 2 | 3 |
| 63 | 15 | 14 | 13 | 12 | 5 | 10 | 8 | 4 | 0 | 7 | 11 | 6 | 9 | 1 | 2 | 3 |

| REGION NUMBER | RANKING | | | |
|---|---|---|---|---|
| | 0 | 1 | 2 | 3 |
| 0 | 3 | 2 | 1 | 0 |
| 1 | 2 | 0 | 3 | 6 |
| 2 | 1 | 0 | 3 | 9 |
| 3 | 0 | 1 | 2 | 4 |
| 4 | 6 | 4 | 7 | 2 |
| 5 | 7 | 6 | 5 | 4 |
| 6 | 4 | 5 | 6 | 0 |
| 7 | 5 | 4 | 7 | 13 |
| 8 | 9 | 8 | 11 | 1 |
| 9 | 8 | 9 | 10 | 0 |
| 10 | 11 | 10 | 9 | 8 |
| 11 | 10 | 8 | 11 | 14 |
| 12 | 12 | 13 | 14 | 8 |
| 13 | 13 | 12 | 15 | 5 |
| 14 | 14 | 12 | 15 | 10 |
| 15 | 15 | 14 | 13 | 12 |

RADIO COMMUNICATION APPARATUS AND SIGNAL PROCESSING METHOD

CROSS-REFERENCE TO RELATED APPLICATION

This application is based upon and claims the benefit of priority of Japanese Patent Application No. 2012-182343 filed on Aug. 21, 2012, the entire contents of which are incorporated herein by reference.

FIELD

An aspect of this disclosure relates to a radio communication system.

BACKGROUND

Research on Multiple Input Multiple Output (MIMO) technologies, which constitute a part of the next generation communication technologies, has been actively performed in these years. In a MIMO system, a transmitter having multiple transmitting antennas transmits multiple data streams, and a receiver having multiple receiving antennas separates and receives the multiple data streams.

FIG. 1 illustrates an exemplary MIMO system.

In FIG. 1, a transmitter includes M transmitting antennas and a receiver includes N receiving antennas. In this example, for brevity, it is assumed that the transmitter transmits M data streams that correspond to the number of transmitting antennas. It is also assumed that M≤N, and the receiver receives N signals. The received signals are represented by formula (1) below where a vector x with M rows and one column indicates the data streams, H indicates a channel matrix including N rows and M columns of elements each indicating a propagation path gain $h_{ij}$ between a j-th transmitting antenna and an i-th receiving antenna, a vector y with N rows and one column indicates the received signals, and a vector n with N rows and one column indicates noise.

$$y = Hx + n \quad (1)$$

$$\begin{pmatrix} y_0 \\ y_1 \\ \vdots \\ y_{N-1} \end{pmatrix} = \begin{pmatrix} h_{00} & h_{01} & \cdots & h_{0,M-1} \\ h_{10} & h_{11} & \cdots & h_{1,M-1} \\ \vdots & \vdots & \ddots & \vdots \\ h_{N-1,0} & h_{N-1,1} & \cdots & h_{N-1,M-1} \end{pmatrix} \begin{pmatrix} x_0 \\ x_1 \\ \vdots \\ x_{M-1} \end{pmatrix} + \begin{pmatrix} n_0 \\ n_1 \\ \vdots \\ n_{N-1} \end{pmatrix}$$

Known stream separation methods at the receiving end include Minimum Mean Square Error (MMSE) and Maximum Likelihood Detection (MLD).

In MLD, metrics such as squared Euclidean distances are calculated for all combinations of symbol replica candidates of stream signals, and one of the combinations with the smallest total metric is selected as separated stream signals. Compared with a linear separation method such as MMSE, MLD provides excellent reception characteristics. Here, when $m_l$ indicates a modulation level (e.g., m=4 for QPSK, m=16 for 16 QAM, and m=64 for 64 QAM) of a first transmission signal, the number of combinations is represented by formula (2) below.

$$\prod_{k=1}^{M} m_k \quad (2)$$

According to formula (2), the number of metric calculations increases exponentially as the number of modulation levels and the number of transmission streams increase and as a result, the processing load increases drastically. For this reason, various types of MLD methods that can reduce the number of calculations have been proposed.

For example, QRM-MLD based on a combination of QR decomposition and M algorithm is known (see, for example, K. J. Kim and J. Yue, "Joint channel estimation and data detection algorithms for MIMO-OFDM systems," in Proc. Thirty-Sixth Asilomar Conference on Signals, Systems and Computers, pp. 1857-1861, November 2002). In QRM-MLD, metrics such as squared Euclidean distances between all symbol replica candidates and surviving symbol replica candidates of the previous stage are calculated. When $S_k$ indicates the number of surviving candidates of a k-th stage (k=1 through M), the number of metric calculations is represented by formula (3) below.

$$S_1 + \sum_{k=2}^{M} m_k S_{k-1} \quad (3)$$

The adaptive selection of surviving symbol replica candidates based on maximum reliability (ASESS) is also known (see, for example, K. Higuchi, H. Kawai, N. Maeda and M. Sawahashi, "Adaptive Selection of Surviving Symbol Replica Candidates Based on Maximum Reliability in QRM-MLD for OFCDM MIMO Multiplexing," Proc. of IEEE Globecom 2004, pp. 2480-2486, November 2004; and Higuchi, Kawai, Maeda and Sawahashi, "Adaptive Selection Algorithm of Surviving Symbol Replica Candidates in QRM-MLD for MIMO Multiplexing Using OFCDM Wireless Access," RCS2004-69, May 2004). ASESS is a variation of QRM-MLD and designed to further reduce the number of metric calculations. In the ASESS method, symbol replica candidates in each stage are ranked by region detection, and metrics corresponding to the number of surviving symbol replica candidates are calculated for symbol replicas in ascending order of cumulative metric values. When $S_k$ indicates the number of surviving candidates of the k-th stage (k=1 through M), the number of metric calculations is represented by formula (4) below.

$$\sum_{k=1}^{M} S_k \quad (4)$$

According to the ASESS method, the number of metric calculations linearly increases as the number of transmission streams increases.

There also exists a variation of List Sphere Decoding (LSD) where a method of ranking symbol candidates is employed.

The ASESS method is described in more detail below. In the descriptions below, for brevity, it is assumed that M=N. Formula (5) is obtained by decomposing a channel matrix H into a unitary matrix Q and an upper triangular matrix R.

$$H = QR = \begin{pmatrix} q_{00} & q_{01} & \cdots & q_{0,N-1} \\ q_{10} & q_{11} & \cdots & q_{1,N-1} \\ \vdots & \vdots & \ddots & \vdots \\ q_{N-1,0} & q_{N-1,1} & \cdots & q_{N-1,N-1} \end{pmatrix} \begin{pmatrix} r_{00} & r_{01} & \cdots & r_{0,N-1} \\ & r_{11} & \cdots & r_{1,N-1} \\ O & & \ddots & \vdots \\ & & & r_{N-1,N-1} \end{pmatrix} \quad (5)$$

In formula (5), 0 indicates a null matrix. That is, 0 indicates that matrix elements are zero. "Elements" may also be referred to as "components". Received signals y can be orthogonalized as indicated by formula (6) by multiplying the received signals y by the Hermitian conjugate of the unitary matrix Q from the left.

$$z = Q^H y = Q^H QRx + Q^H n = Rx + n' \quad (6)$$

$$\begin{pmatrix} z_0 \\ z_1 \\ \vdots \\ z_{N-1} \end{pmatrix} = \begin{pmatrix} r_{00} & r_{01} & \cdots & r_{0,N-1} \\ & r_{11} & \cdots & r_{1,N-1} \\ O & & \ddots & \vdots \\ & & & r_{N-1,N-1} \end{pmatrix} \begin{pmatrix} x_0 \\ x_1 \\ \vdots \\ x_{N-1} \end{pmatrix} + \begin{pmatrix} n'_0 \\ n'_1 \\ \vdots \\ n'_{N-1} \end{pmatrix}$$

In a first stage, for the last row, region detection is performed for $u_{N-1} = z_{N-1}/r_{N-1,N-1}$ and a region number $\epsilon^{(1)}$ of a region to which $u_{N-1}$ belongs is determined. In the region detection, quadrant detection is performed Ndiv times, origin shift is performed Ndiv−1 times, and one of $2^{2Ndiv}$ regions is determined. Top $S_1$ replica candidates ($S_1$ indicates the number of surviving candidates) in a symbol ranking table $\Omega$ are selected as surviving paths of the first stage, and metrics such as squared Euclidean distances are calculated for the surviving paths. The surviving paths are represented by formula (7) below.

$$\Pi_1^{(1)}(i) = \Omega^{(mN)}(\epsilon, i) \quad (7)$$

When squared Euclidean distances are used as metrics, formula (8) is obtained.

$$d_1(i) = |z_{N-1} - r_{N-1,N-1} c_{N-1,\Pi_1^{(1)}(i)}|^2, \; i = 0, 1, \ldots, S_1 - 1 \quad (8)$$

Here, $\Omega^{(4)}$, $\Omega^{(16)}$, and $\Omega^{(64)}$ indicate symbol ranking tables for QPSK, 16QAM, and 64QAM, respectively. $\Omega^{(mN)}(\epsilon^{(l)}, i)$ indicates a symbol number of an i-th ranked symbol stored in the symbol ranking table and corresponding to the region number $\epsilon^{(l)}$.

In a second stage, the $S_l$ replica candidates selected as the surviving paths in the first stage are cancelled from the second last received signal $z_{N-2}$ as indicated by formula (9), the result of formula (9) is divided by the second last diagonal component of the upper triangular matrix R as indicated by formula (10), and region detection is performed for the result of formula (10). That is, a region number $\epsilon^{(2)}(i)$ of a region to which $u_{N-2}(i)$ belongs is determined.

$$z'_{N-2}(i) = z_{N-2} - r_{N-2,N-1} c_{N-2,\Pi_1^{(1)}(i)}, \; i = 0, 1, \ldots, S_1 - 1 \quad (9)$$

$$u_{N-2}(i) = z'_{N-2}(i)/r_{N-2,N-2}, \; i = 0, 1, \ldots, S_1 - 1 \quad (10)$$

Surviving paths of the second stage are adaptively selected as described below. A representative metric value E(i) and a current rank $\rho(i)$ of each surviving path of the first stage are initialized. As a result, formula (11) is obtained.

$$\left. \begin{array}{l} E(i) := d_1(i) \\ \rho(i) := 0 \\ q := 0 \end{array} \right\} \quad (11)$$

A replica candidate ranked $\rho(i_{min})$-th ($i_{min}$ is a value that satisfies $\rho(i) < m_{N-2}$ and min[E(i)]) is selected from the symbol ranking table, and a q-th surviving path of the second stage is determined as indicated by formula (12).

$$\left. \begin{array}{l} \prod_1^{(2)}(q) = \prod_1^{(1)}(i_{min}) \\ \prod_2^{(2)}(q) = \Omega^{(m_{N-1})}(\varepsilon^{(2)}(i_{min}), \rho(i_{min})) \\ i_{min} = \underset{\rho(i) < m_{N-2}}{\arg} (\min[E(i)]) \end{array} \right\} \quad (12)$$

A cumulative metric is calculated. Formula (13) is obtained.

$$d_2(q) = d_1(i_{min}) + |z'_{N-2}(i_{min}) - r_{N-2,N-2} c_{N-2,\Pi_2^{(2)}(q)}|^2 \quad (13)$$

Then, according to formula (14), the representative metric value and the current rank are updated.

$$\left. \begin{array}{l} E(i_{min}) := d_2(q) \\ \rho(i_{min}) := \rho(i_{min}) + 1 \\ q := q + 1 \end{array} \right\} \quad (14)$$

The above process is repeated until "q" reaches the number of surviving paths $S_2$ of the second stage.

In a subsequent k-th stage, $S_{k-1}$ replica candidates selected as the surviving paths in the (k−1)th stage are cancelled from the k-th received signal $z_{N-k}$ from the last as indicated by formula (15).

$$z'_{N-k}(i) = z_{N-k} - \sum_{p=1}^{k-1} r_{N-k+1,N-p+1} c_{N-p+1,\Pi_p^{(k-1)}(i)}, \quad (15)$$

$$i = 0, 1, \ldots, S_{k-1} - 1$$

Region detection is performed for $u_{N-k}(i) = z'_{N-k}(i)/r_{N-k,N-k}$ ($i = 0, 1, \ldots, S_{k-1}-1$), which is obtained by dividing the result of formula (15) by the k-th diagonal component from the last of the upper triangular matrix R, and a region number $\epsilon^{(k)}(i)$ to which $u_{N-k}(i)$ belongs is determined. Surviving paths of the k-th stage are adaptively selected as described below. A representative metric value E(i) and a current rank $\rho(i)$ of each surviving path of the (k−1)th stage are initialized. Formula (16) is obtained.

$$\left. \begin{array}{l} E(i) := d_{k-1}(i) \\ \rho(i) := 1 \\ q := 1 \end{array} \right\} \quad (16)$$

A replica candidate ranked $\rho(i_{min})$-th ($i_{min}$ is a value that satisfies $\rho(i) \le m_{N-k}$ and min[E(i)]) is selected from the symbol ranking table. The q-th surviving path of the k-th stage is represented by formula (17).

$$\prod_{1-k-1}^{(k)}(q) = \prod^{(k-1)}(i_{min}) \qquad (17)$$

$$\prod_{k}^{(k)}(q) = \Omega^{(m_{N-k})}(\varepsilon^{(k)}(i_{min}),\rho(i_{min}))$$

$$i_{min} = \underset{\rho(i)<m_{N-k}}{\arg}(\min[E(i)])$$

A cumulative metric is calculated and formula (18) is obtained.

$$d_k(q)=d_{k-1}(i_{min})+|z'_{N-k}(i_{min})-r_{N-k,N-k}c_{N-k,\Pi_k^{(k)}(q)}|^2 \qquad (18)$$

Then, according to formula (19), the representative metric value and the current rank are updated.

$$E(i_{min}) := d_k\left(\prod^{(k)}(q)\right) \qquad (19)$$

$$\rho(i_{min}) := \rho(i_{min}) + 1$$

$$q := q + 1$$

The above process is repeated until "q" reaches the number of surviving paths $S_k$ of the k-th stage.

Processes are performed up to the N-th stage, and surviving paths with the smallest cumulative metric $d_N$ are determined as a combination of most-likely symbols. When the signal is error-correction encoded, a log likelihood ratio (LLR) is calculated.

SUMMARY

According to an aspect of the embodiments of the invention, there is provided a radio communication apparatus that includes a plurality of antennas; a radio frequency unit configured to receive, via the antennas, signals transmitted from a transmitter including a plurality of antennas; and a baseband processor configured to obtain channel estimates based on the received signals and perform signal detection based on the channel estimates according to a QRM-MLD method. The baseband processor includes a stream separator configured to perform first through N-th stage processes for the signal detection. In the first stage process, the stream separator detects a region to which a signal belongs, selects symbol candidates based on the detected region, and calculates metrics for the selected symbol candidates. In each of second through (N–1)th stage processes, the stream separator selects symbol candidates based on the metrics calculated for the symbol candidates selected in a previous stage. After starting calculation of the metrics for the symbol candidates selected in the previous stage, the stream separator selects symbol candidates of a next stage based on metrics of surviving paths to which the symbol candidates whose metrics have been calculated belong.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a table illustrating an exemplary configuration of a surviving candidate buffer of a first stage processor;

FIG. 9 is a table illustrating an exemplary configuration of a surviving candidate buffer of a k-th stage processor;

FIG. 10 is a table illustrating an exemplary configuration of a representative metric buffer of a k-th stage processor;

FIG. 13 is a table illustrating an exemplary configuration of a representative metric buffer of an N-th stage processor;

FIG. 23 is an example of a symbol ranking table;

FIG. 25 is an example of a symbol ranking table;

FIG. 27 is an example of a symbol ranking table;

FIG. 29 is an example of a symbol ranking table;

FIG. 31 is an example of a symbol ranking table;

FIG. 34 is an example of a symbol ranking table.

DESCRIPTION OF EMBODIMENTS

According to the ASESS method, in a loop that is repeated the number of surviving paths, the representative metric is updated after the calculation of the cumulative metric, and the smallest one of updated representative metrics is selected.

Thus, the ASESS method is a sequential algorithm where processes implemented by repeating the loop cannot be executed in parallel.

Figure 1:
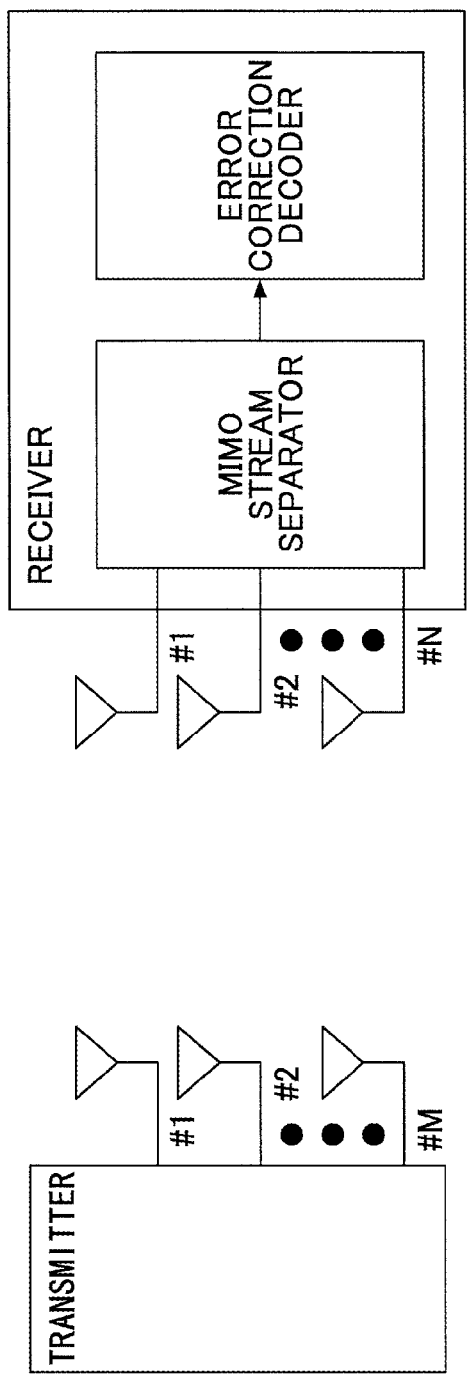
FIG. 1 is a drawing illustrating an exemplary MIMO system.
Figure 2:
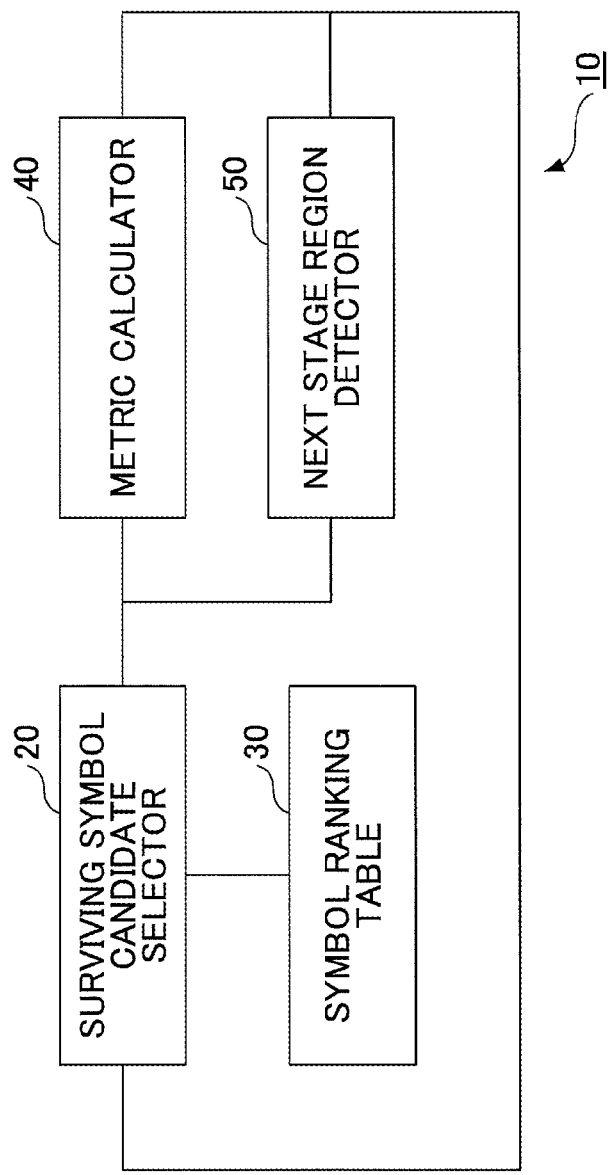
FIG. 2 is a block diagram illustrating an exemplary configuration of an apparatus that performs an ASESS method.

FIG. 2 is a block diagram illustrating an exemplary configuration of an apparatus 10 that performs the ASESS method.

The apparatus 10 includes a surviving symbol candidate selector 20, a symbol ranking table 30, a metric calculator 40, and a next stage region detector 50.

Figure 3:
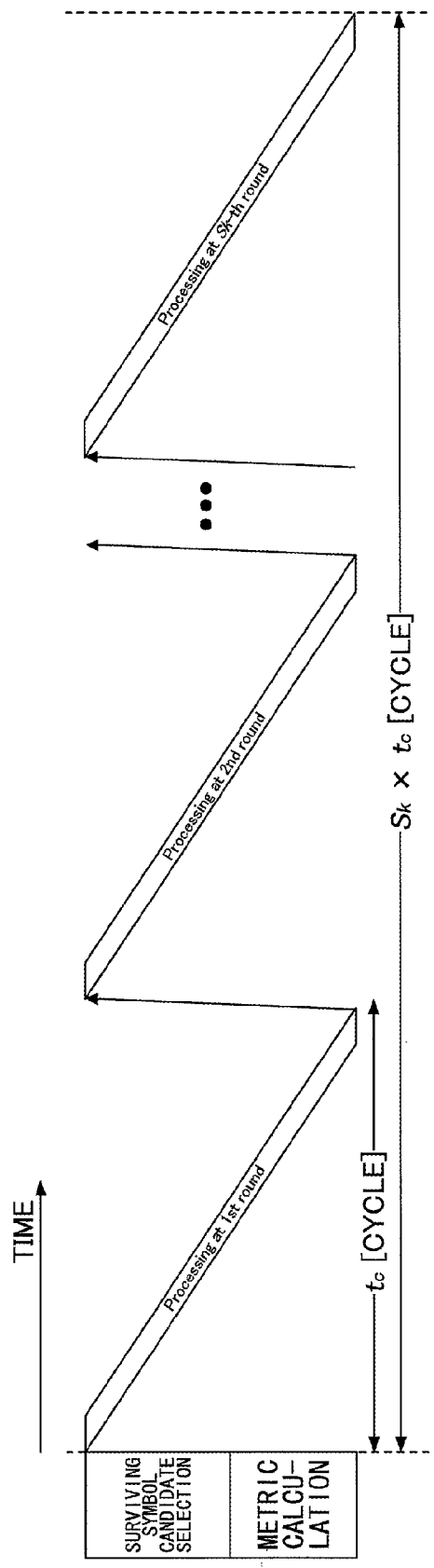
FIG. 3 is a timing chart illustrating an exemplary process according to the ASESS method.

FIG. 3 is a timing chart illustrating an exemplary process according to the ASESS method.

Assuming that a period of time indicated by a $t_c$ cycle is necessary for each process from the selection of surviving symbol candidates by the surviving symbol candidate selector 20 to the calculation of a cumulative metric by the metric calculator 40, the period of time necessary for repeating the process $S_k$ times, i.e., up to the k-th stage, is $S_k \times t_c$ cycles.

As illustrated by FIG. 3, the processes are executed sequentially. Accordingly, with this method, processes cannot be performed concurrently by multiple functional blocks and therefore it is not possible to efficiently use hardware resources.

Here, in MIMO, multiple received signals need to be decoded. For example, in a 3GPP LTE system where orthogonal frequency division multiplexing (OFDM) is employed for downlink, it is necessary to process multiple resource elements (RE) that are uniquely determined based on subcarrier positions in the frequency direction and OFDM symbol positions in the time direction.

To efficiently use hardware resources, processes for "tc" REs (here, "tc" indicates the number of REs) may be pipelined. Pipelining the processes for "tc" REs also makes it possible to increase the entire processing speed.

However, pipelining processes may necessitate providing memories for storing data used to select surviving symbol candidates and memories for storing data to be passed along to next stages. This in turn may increase the circuit size of an apparatus.

An aspect of this disclosure makes it possible to provide a radio communication apparatus that can perform a signal separation process at a high speed.

Preferred embodiments of the present invention are described below with reference to the accompanying drawings.

Throughout the accompanying drawings, the same reference numbers are used for components having the same functions, and overlapping descriptions of those components are omitted.

<Radio Communication System>

Figure 4:
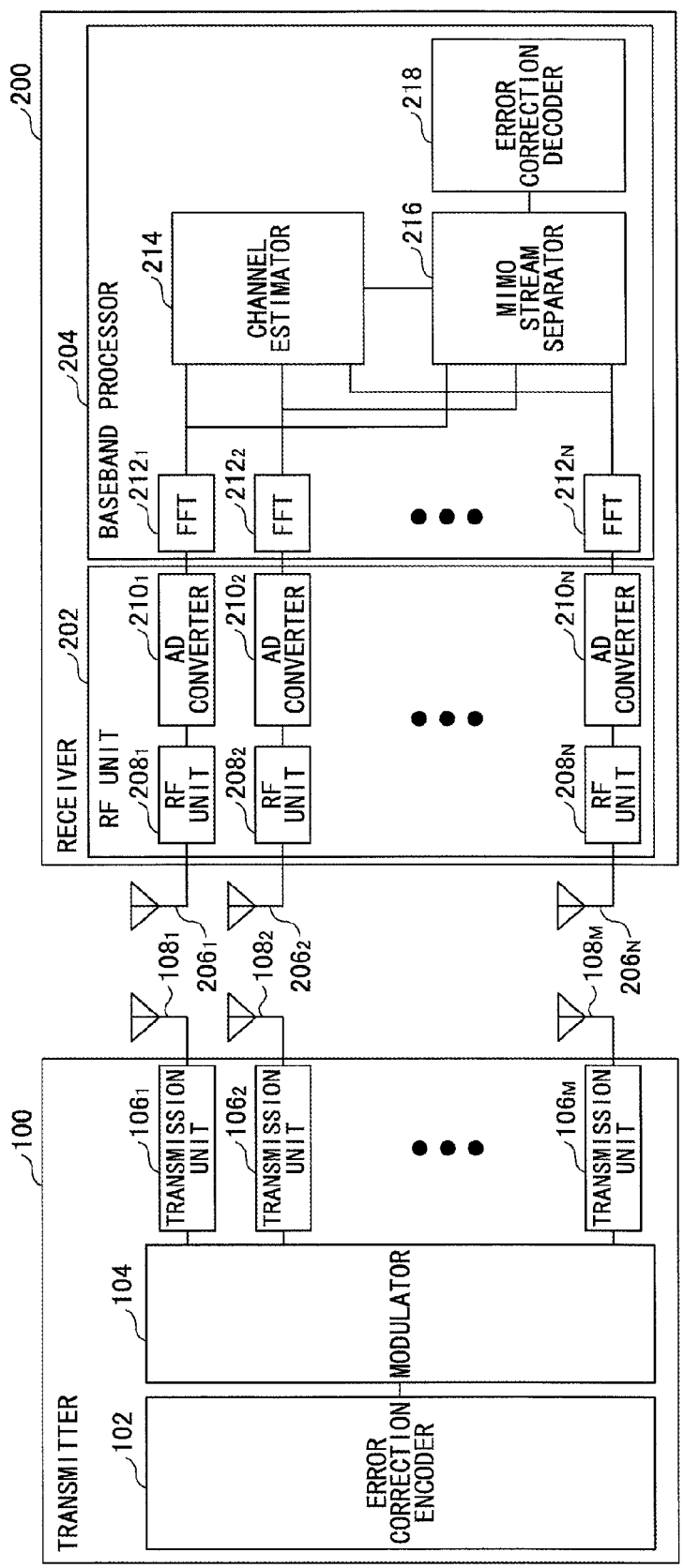
FIG. 4 is a drawing illustrating an exemplary configuration of a MIMO system.

FIG. 4 illustrates an exemplary configuration of a MIMO system that is used as an example of a radio communication system according to an embodiment. The MIMO system may include a transmitter 100 and a receiver 200. One or both of the transmitter 100 and the receiver 200 may be components of radio communication apparatuses such as a base station and a user terminal.

The transmitter 100 may include M transmitting antennas $108_1$ through $108_M$ (M is an integer greater than 0). The transmitter 100 may also include an error correction encoder 102, a modulator 104, and transmission units $106_1$ through $106_M$ corresponding to the transmitting antennas $108_1$ through $108_M$.

The error correction encoder 102 performs error correction encoding on transmission data. The error correction encoder 102 inputs the error-correction-encoded transmission data to the modulator 104.

The modulator 104 is connected to the error correction encoder 102. The modulator 104 modulates the error-correction-encoded transmission data according to a modulation scheme such as QPSK (Quadrature Phase Shift Keying), 16 QAM (Quadrature Amplitude Modulation), or 64 QAM. The modulator 104 separates the modulated transmission data into streams and inputs the streams to the transmission units $106_1$ through $106_M$.

The transmission units $106_1$ through $106_M$ are connected to the modulator 104. The transmission units $106_1$ through $106_M$ up-convert the streams from the modulator 104 to a radio frequency.

The transmitting antennas $108_1$ through $108_M$ are connected to the corresponding transmission units $106_1$ through $106_M$. The transmitting antennas $108_1$ through $108_M$ transmit the up-converted streams at substantially the same time.

The receiver 200 may include N receiving antennas $206_1$ through $206_N$ (N is an integer greater than 0). The receiver 200 may also include a radio frequency (RF) unit 202 and a baseband processor 204. The RF unit 202 may be implemented by, for example, a radio frequency integrated circuit (RFIC). The baseband processor 204 may be implemented by, for example, a digital signal processor (DSP), software, or a hardware logic.

The RF unit 202 may include RF units $208_1$ through $208_N$ and AD converters $210_1$ through $210_N$. The baseband processor 204 may include fast Fourier transform (FFT) units $212_1$ through $212_N$, a channel estimator 214, a MIMO stream separator 216, and an error correction decoder 218.

The RF units $208_1$ through $208_N$ are connected to the corresponding receiving antennas $206_1$ through $206_N$. The RF units $208_1$ through $208_N$ down-convert signals received by the receiving antennas $206_1$ through $206_N$, and input the down-converted signals (analog signals) to the corresponding AD converters $210_1$ through $210_N$.

The AD converters $210_1$ through $210_N$ are connected to the corresponding RF units $208_1$ through $208_N$. The AD converters $210_1$ through $210_N$ convert the analog signals input from the RF units $208_1$ through $208_N$ into digital signals, and input the digital signals to the FFT units $212_1$ through $212_N$.

The FFT units $212_1$ through $212_N$ are connected to the corresponding AD converters $210_1$ through $210_N$. The FFT units $212_1$ through $212_N$ perform fast Fourier transformation on the digital signals input from the AD converters $210_1$ through $210_N$, and input the fast-Fourier-transformed signals to the channel estimator 214 and the MIMO stream separator 216.

The channel estimator 214 is connected to the FFT units $212_1$ through $212_N$. Based on, for example, pilot signals in the fast-Fourier-transformed signals from the FFT units $212_1$ through $212_N$, the channel estimator 214 estimates propagation paths and obtains channel estimates. The channel estimator 214 inputs the channel estimates to the MIMO stream separator 216.

The MIMO stream separator 216 is connected to the FFT units $212_1$ through $212_N$ and the channel estimator 214. The MIMO stream separator 216 performs a stream separation process based on the signals from the FFT units $212_1$ through $212_N$ and the channel estimates from the channel estimator 214 to obtain separated streams. For example, the MIMO stream separator 216 performs a stream separation process (signal detection) according to a QRM-MLD method. The MIMO stream separator 216 inputs the separated streams to the error correction decoder 218.

The error correction decoder 218 is connected to the MIMO stream separator 216. The error correction decoder 218 performs error correction decoding on the separated streams input from the MIMO stream separator 216.

<MIMO Stream Separator>

Figure 5:
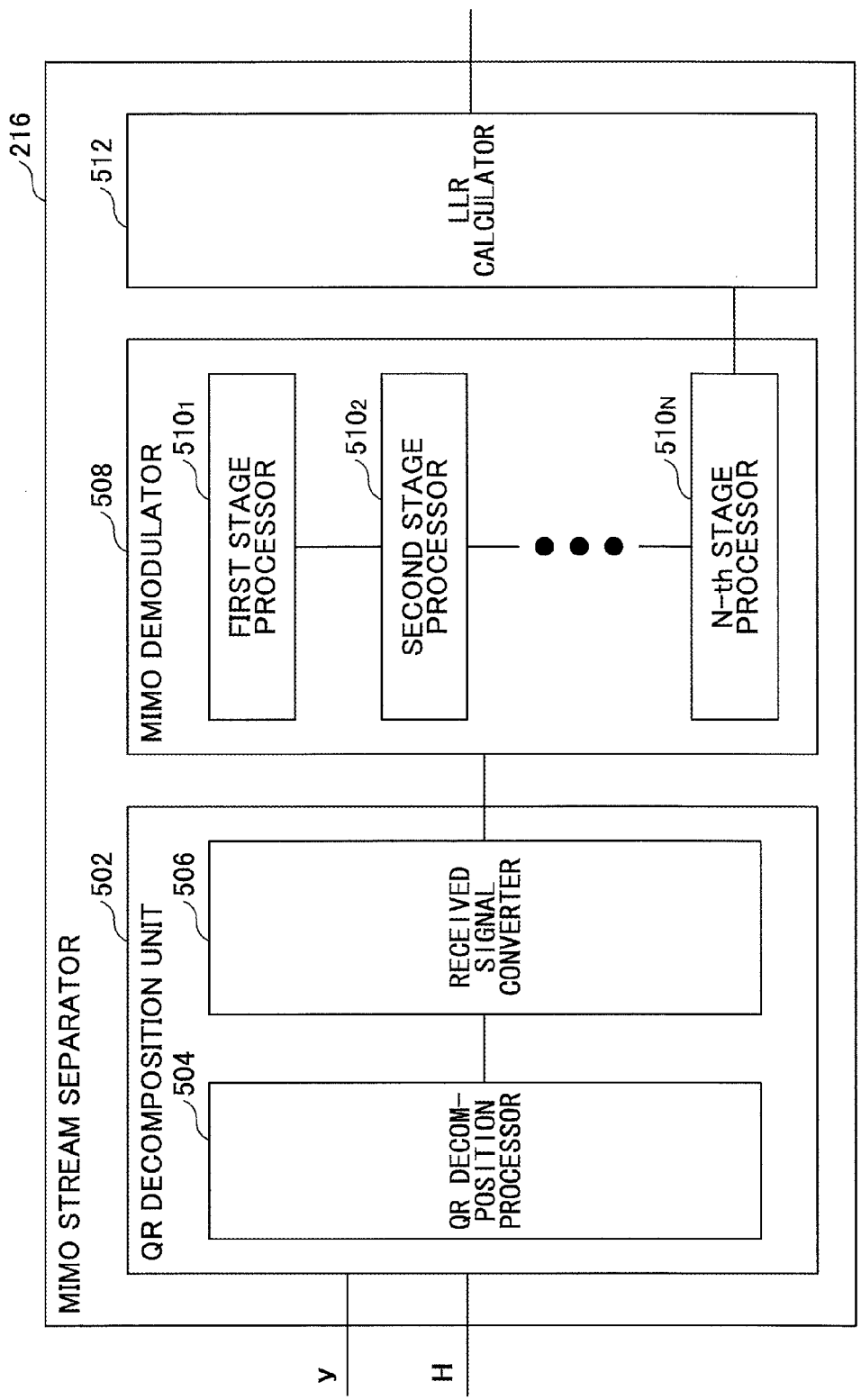
FIG. 5 is a block diagram illustrating an exemplary configuration of a MIMO stream separator.

FIG. 5 is a block diagram illustrating an exemplary configuration of the MIMO stream separator 216.

The MIMO stream separator 216 may include a QR decomposition unit 502, a MIMO demodulator 508, and a log likelihood ratio (LLR) calculator 512.

The QR decomposition unit 502 may include a QR decomposition processor 504 and a received signal converter 506. The MIMO demodulator 508 may include a first stage processor $510_1$, a second stage processor $510_2$, . . . , and an N-th stage processor $510_N$.

The QR decomposition processor 504 performs QR decomposition where a channel matrix H is decomposed into a unitary matrix Q and an upper triangular matrix R. The process performed by the QR decomposition processor 504 is represented by formula (20) below.

$$H = QR = \begin{pmatrix} q_{00} & q_{01} & \cdots & q_{0,N-1} \\ q_{10} & q_{11} & \cdots & q_{,N-1} \\ \vdots & \vdots & \ddots & \vdots \\ q_{N-1,0} & q_{N-1,1} & \cdots & q_{N-1,N-1} \end{pmatrix} \begin{pmatrix} r_{00} & r_{01} & \cdots & r_{0,N-1} \\ & r_{11} & \cdots & r_{1,N-1} \\ O & & \ddots & \vdots \\ & & & r_{N-1,N-1} \end{pmatrix} \quad (20)$$

Here, it is possible to obtain positive real numbers as the diagonal components of the upper triangular matrix R by selecting an appropriate unitary matrix Q.

The received signal converter 506 multiplies a received signal vector y by the Hermitian conjugate of the unitary matrix Q. As a result, a unitary transformation vector z represented by formula (21) below is obtained.

$$z = Q^H y \quad (21)$$

In this case, a relationship represented by formula (22) exists between the unitary transformation vector z and a transmission stream vector x.

$$z = Q^H y = Q^H QR x + Q^H n = Rx + n' \quad (22)$$

$$\begin{pmatrix} z_0 \\ z_1 \\ \vdots \\ z_{N-1} \end{pmatrix} = \begin{pmatrix} r_{00} & r_{01} & \cdots & r_{0,N-1} \\ & r_{11} & \cdots & r_{1,N-1} \\ O & & \ddots & \vdots \\ & & & r_{N-1,N-1} \end{pmatrix} \begin{pmatrix} x_0 \\ x_1 \\ \vdots \\ x_{N-1} \end{pmatrix} + \begin{pmatrix} n'_0 \\ n'_1 \\ \vdots \\ n'_{N-1} \end{pmatrix}$$

Figure 6:
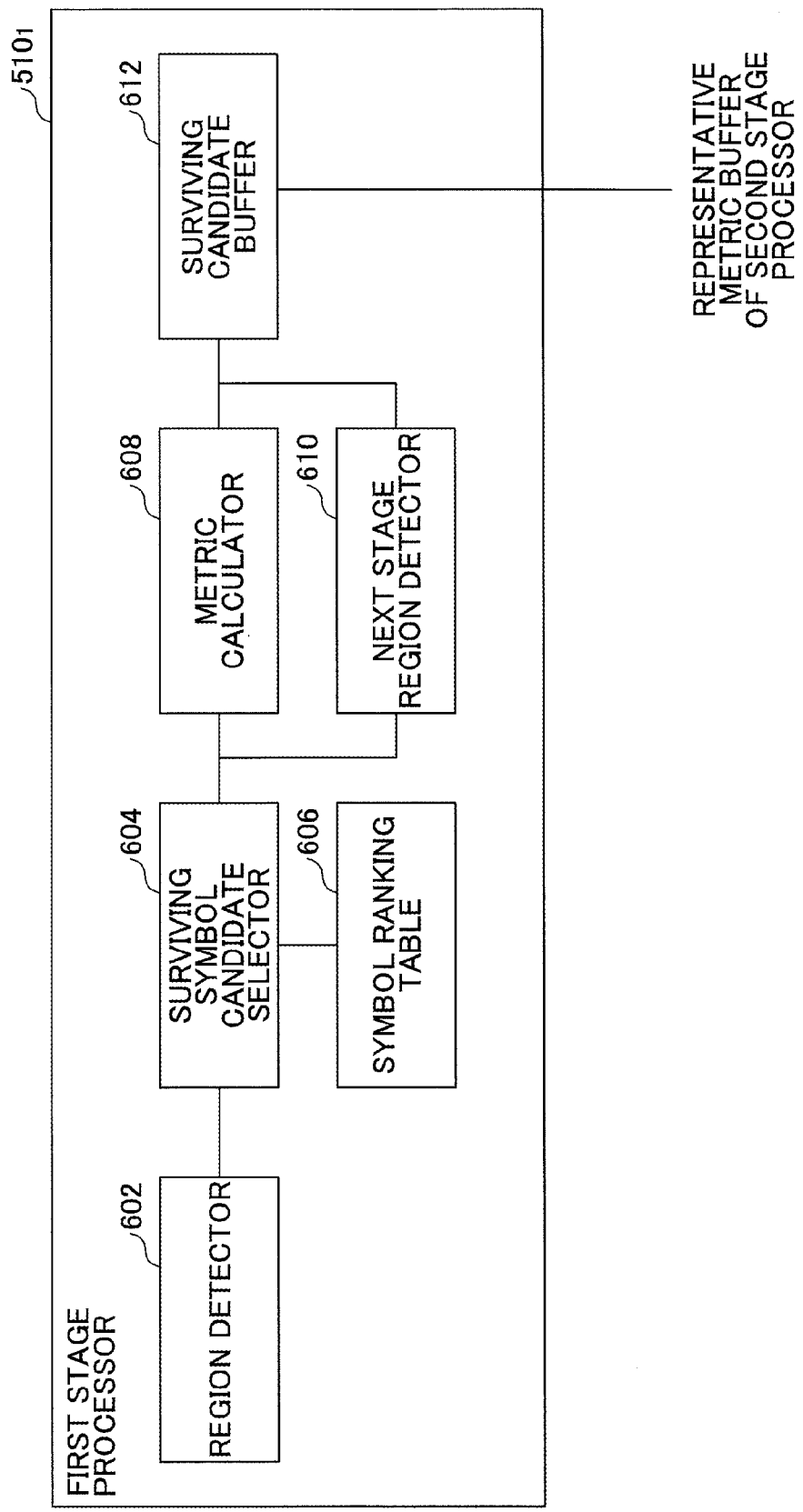
FIG. 6 is a block diagram illustrating an exemplary configuration of a first stage processor.

FIG. 6 is a block diagram illustrating an exemplary configuration of the first stage processor $510_1$. Hereafter, a process performed by the first stage processor $510_1$ may be referred to as a "first stage process". Similarly, processes performed by a k-th stage processor $510_k$ (k=2, 3, . . . , N−1) and the N-th stage processor $510_N$ may be referred to as a "k-th stage process" and an "N-th stage process".

The first stage processor $510_1$ may include a region detector 602, a surviving symbol candidate selector 604, a symbol ranking table 606, a metric calculator 608, a next stage region detector 610, and a surviving candidate buffer 612.

The region detector 602 of the first stage processor $510_1$ performs region detection for the result of formula (23), where the last signal of the unitary transformation vector z is divided by the last diagonal component of the upper triangular matrix R, to determine a region number $\epsilon^{(1)}$ of a region to which $u_{N-1}$ belongs.

$$u_{N-1} = \frac{z_{N-1}}{r_{N-1,N-1}} \quad (23)$$

The symbol ranking table 606 of the first stage processor $510_1$ contains, for each region number, symbol candidates $c_{N-1,i}$ (i=1, 2, . . . , $m_{N-1}$) of a transmission signal $X_{N-1}$ that are ranked in ascending order of the distance between the region center and the respective symbol candidates $c_{N-1,i}$.

The surviving symbol candidate selector 604 of the first stage processor $510_1$ refers to the symbol ranking table 606 and selects top $S_1$ symbol candidates ($S_1$ indicates the number of surviving candidates) in the ranking as surviving paths of the first stage. The surviving paths selected by the surviving symbol candidate selector 604 of the first stage processor $510_1$ are represented by formula (24) below. The number of surviving candidates $S_1$ may be predetermined.

$$\Pi_1^{(1)}(i) = \Omega^{(m_{N-1})}(\epsilon, i), i=0,1,2,\ldots,S_1-1 \quad (24)$$

Here, $\Pi^{(k)}(i)$ indicates an i-th surviving path of a k-th stage. $\Pi^{(k)}_j(i)$ indicates a path in a j-th stage (j=1, 2, . . . , k) corresponding to an i-th surviving path of a k-th stage. $\Pi^{(k)}_{a-b}(i)$ (a<b) indicates a partial path of an i-th surviving path of a k-th stage in stages from an a-th stage to a b-th stage. For example, in the case of formula (25), these paths are represented by formula (26).

$$\prod^{(4)} = \{(0, 1, 2, 3), (0, 2, 1, 1), (1, 2, 3, 0), (2, 0, 0, 1)\} \quad (25)$$

$$\begin{aligned} \prod^{(4)}(1) &= (0, 2, 1, 1) \\ \prod^{(4)}_3(2) &= 3 \\ \prod^{(4)}_{1-3}(0) &= (0, 1, 2) \end{aligned} \quad (26)$$

The metric calculator 608 of the first stage processor $510_1$ calculates metrics such as squared Euclidean distances. When squared Euclidean distances are used as metrics, they are expressed by formula (27).

$$d_1(i) = |z_{N-1} - r_{N-1,N-1} c_{N-1,\Pi_1^{(1)}(i)}|^2, i=0,1,\ldots,S_1-1 \quad (27)$$

Here, $\Omega^{(4)}$, $\Omega^{(16)}$, and $\Omega^{(64)}$ indicate symbol ranking tables for QPSK, 16QAM, and 64QAM, respectively. $\Omega^{(mN)}(\epsilon^{(1)}, i)$ indicates a symbol number of an i-th ranked symbol stored in the symbol ranking table and corresponding to the region number $\epsilon^{(1)}$.

$c_{N-1,i}$ may be referred to as a "signal point" in a modulation scheme used to transmit a transmission stream $x_{N-1}$. Examples of modulation schemes used in the present embodiment include, but are not limited to, QPSK, 16QAM, and 64QAM.

As indicated by formula (28), the next stage region detector 610 of the first stage processor $510_1$ cancels the symbol replica candidates selected by the surviving symbol candidate selector 604 from the second last received signal $z_{N-2}$.

$$z'_{N-2}(i) = z_{N-2} - r_{N-2,N-1} c_{N-1,\Pi_1^{(1)}(i)} \quad (28)$$

The next stage region detector 610 of the first stage processor $510_1$ performs region detection for a signal represented by formula (29), where the result of formula (28) is divided by the second last diagonal component of the upper triangular matrix R, to determine a region number $\epsilon^{(2)}(i)$ of a region to which $u_{N-2}(i)$ belongs.

$$u_{N-2}(i) = z'_{N-2}(i)/r_{N-2,N-2} \qquad (29)$$

The surviving candidate buffer 612 of the first stage processor 510$_1$ includes, as elements, cumulative metrics $d_1(i)$, signals $z'_{N-2}(i)$ obtained by cancelling symbol replica candidates from the second last received signal, region numbers $\epsilon^{(2)}(i)$, and surviving symbol candidate numbers $\Pi^{(1)}{}_1(i)$.

Each time a cumulative metric is calculated, the surviving candidate buffer 612 of the first stage processor 510$_1$ stores the cumulative metric calculated by the metric calculator 608 and $z'_{N-2}(i)$ calculated by the next stage region detector 610.

Also, each time a cumulative metric is calculated, the surviving candidate buffer 612 of the first stage processor 510$_1$ stores the surviving symbol candidate number selected by the surviving symbol candidate selector 604 and the region number $\epsilon^{(2)}(i)$ detected by the next stage region detector 610.

When the first stage process is started, the surviving candidate buffer 612 of the first stage processor 510$_1$ is empty. When the first stage process is completed, $S_1$ elements are stored in the surviving candidate buffer 612 of the first stage processor 510$_1$.

FIG. 7 is a table illustrating an exemplary configuration of the surviving candidate buffer 612 of the first stage processor 510$_1$. $z'_{N-2}(i)$ is a complex number. In FIG. 7, $z'_{N-2}(i)$ is expressed in a format (I component, Q component).

Next, a k-th stage process (k=2, 3, . . . , N−1) performed after the first stage process is described.

Figure 8:
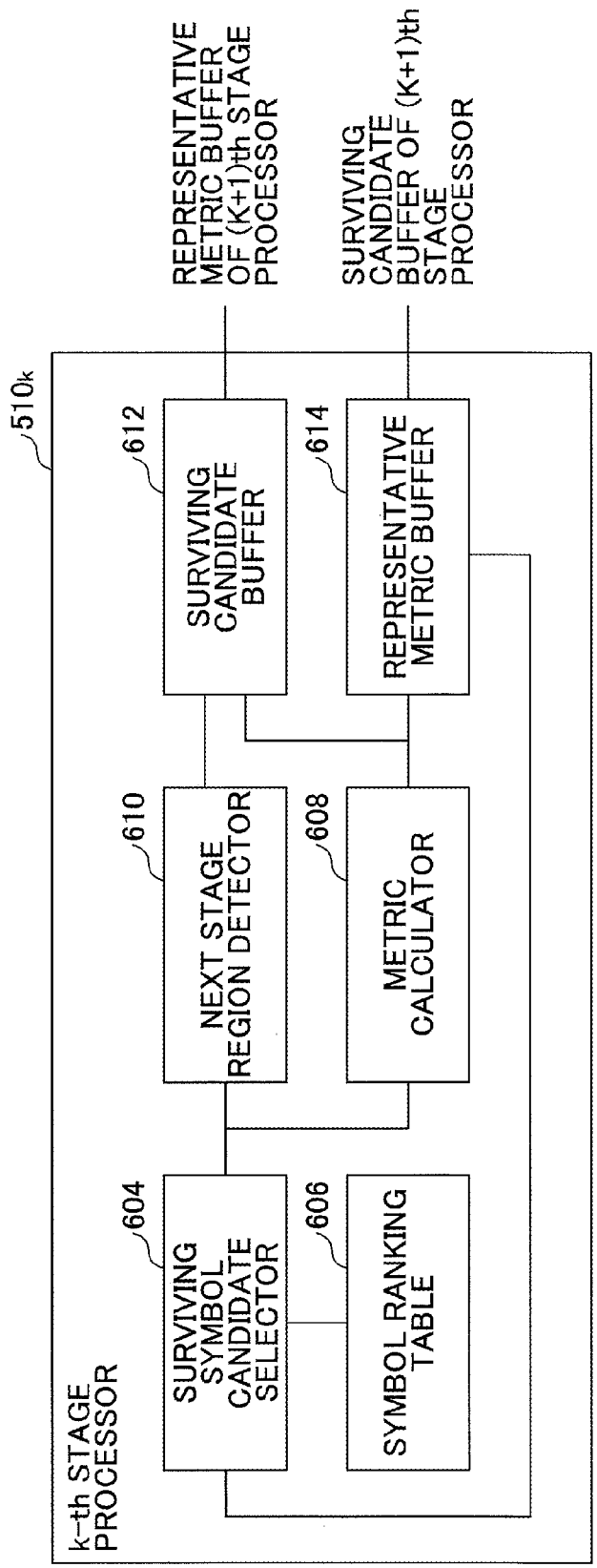
FIG. 8 is a block diagram illustrating an exemplary configuration of a k-th stage processor.

FIG. 8 is a block diagram illustrating an exemplary configuration of a k-th stage processor 510$_k$ (i.e., one of the second through N−1 stage processors 510). The k-th stage processor 510$_k$ may include a surviving symbol candidate selector 604, a symbol ranking table 606, a metric calculator 608, a next stage region detector 610, a surviving candidate buffer 612, and a representative metric buffer 614.

The surviving candidate buffer 612 of the k-th stage processor 510$_k$ includes, as elements, cumulative metrics $d_k(i)$, signals $z'_{N-k-1}(i)$ obtained by cancelling symbol replica candidates from the (k+1)th received signal from the last, region numbers $\epsilon^{(k+1)}(i)$, and surviving symbol candidate numbers $\Pi^{(k)}(i)$.

Each time a cumulative metric is calculated, the surviving candidate buffer 612 of the k-th stage processor 510$_k$ stores the cumulative metric calculated by the metric calculator 608 and $z'_{N-k-1}(i)$ calculated by the next stage region detector 610. Also, each time a cumulative metric is calculated, the surviving candidate buffer 612 of the k-th stage processor 510$_k$ stores the surviving symbol candidate numbers selected by the surviving symbol candidate selector 604 and the region number $\epsilon^{(k+1)}(i)$ detected by the next stage region detector 610.

When the k-th stage process is started, the surviving candidate buffer 612 of the k-th stage processor 510$_k$ is empty. When the k-th stage process is completed, $S_k$ elements are stored in the surviving candidate buffer 612 of the k-th stage processor 510$_k$.

FIG. 9 is a table illustrating an exemplary configuration of the surviving candidate buffer 612 of the k-th stage processor 510$_k$. The surviving candidate buffer 612 of the k-th stage processor 510$_k$ stores k surviving symbol candidate numbers for each element.

The representative metric buffer 614 of the k-th stage processor 510$_k$ includes, as elements, representative metrics $E(i)$, signals $z'_{N-k}(i)$ obtained by cancelling surviving symbol replica candidates of up to the previous stage, and region numbers $\epsilon^{(k)}(i)$. The representative metric buffer 614 of the k-th stage processor 510$_k$ also includes, as elements, cumulative metrics $d_{k-1}(i)$ of up to the previous stage, surviving symbol candidate numbers $\Pi^{(k-1)}(i)$ of up to the previous stage, and current ranks $\rho(i)$.

FIG. 10 is a table illustrating an exemplary configuration of the representative metric buffer 614 of the k-th stage processor 510$_k$. The representative metric buffer 614 of the k-th stage processor 510$_k$ stores k−1 surviving symbol candidate numbers for each element.

After the (k−1)th stage is completed and when the k-th stage is started, the representative metric buffer 614 of the k-th stage processor 510$_k$ is initialized as indicated by formula (30) based on the data of a surviving candidate buffer 612 of a (k−1)th stage processor 510$_{k-1}$.

$$\left.\begin{array}{l} E(i) := d_{k-1}(i) \\ z'_{N-k}(i) := z'_{N-k}(i) \\ \varepsilon^{(k)}(i) := \varepsilon^{(k)}(i) \\ d_{k-1}(i) := d_{k-1}(i), \, i = 0, 1, \ldots, S_{k-1} \\ \prod^{(k-1)}(i) := \prod^{(k-1)}(i) \\ \rho(i) := 0 \end{array}\right\} \qquad (30)$$

The representative metrics $E(i)$ are initialized based on cumulative metrics $d_{k-1}(i)$ of the surviving candidate buffer 612 of the (k−1)th stage processor 510$_{k-1}$. The signals $z'_{N-k}(i)$ are initialized based on signals $z'_{N-k}(i)$ of the surviving candidate buffer 612 of the (k−1)th stage processor 510$_{k-1}$. The region numbers $\epsilon^{(k)}(i)$ are initialized based on region numbers $\epsilon^{(k)}(i)$ of the surviving candidate buffer 612 of the (k−1)th stage processor 510$_{k-1}$. The cumulative metrics $d_{k-1}(i)$ are initialized based on cumulative metrics $d_{k-1}(i)$ of the surviving candidate buffer 612 of the (k−1)th stage processor 510$_{k-1}$. The surviving symbol candidate numbers $\Pi^{(k-1)}(i)$ are initialized based on surviving symbol candidate numbers $\Pi^{(k-1)}(i)$ of the surviving candidate buffer 612 of the (k−1)th stage processor 510$_{k-1}$. The current ranks $\rho(i)$ are initialized to 0. The number of elements of the representative metric buffer 614 of the k-th stage processor 510$_k$ becomes equal to the number of surviving candidates $S_{k-1}$ of the (k−1)th stage.

The surviving symbol candidate selector 604 adaptively selects surviving paths of the k-th stage as described below. First, the surviving symbol candidate selector 604 initializes $q_1$ and $q_2$ as indicated by formula (31).

$$\left.\begin{array}{l} q_1 := 0 \\ q_2 := 0 \end{array}\right\} \qquad (31)$$

As an initial process, the surviving symbol candidate selector 604 selects first (or top) δ surviving paths (δ indicates a number) in ascending order of representative metrics $E(i)$, and assigns indices $\mu(0), \mu(1), \ldots, \mu(\delta-1)$ to the selected surviving paths.

(1) The surviving symbol candidate selector 604 initializes $q_2$ to $q_2:=0$.

(2) The surviving symbol candidate selector 604 selects a $\rho(\mu(q_2))$th ranked symbol candidate number in surviving paths $\mu(q_2)$ from the symbol ranking table 606, and determines a $(\delta q_1 + q_2)$th surviving path of the k-th stage as indicated by formula (32).

$$\prod_{1 \sim k-1}^{(k)} (\delta q_1 + q_2) = \prod^{(k-1)} (\mu(q_2))$$

$$\prod_k^{(k)} (\delta q_1 + q_2) = \Omega^{(m_{N-k})}(\varepsilon^{(k)}(\mu(q_2)), \rho(\mu(q_2)))$$

(32)

(3) As indicated by formula (33), the next stage region detector 610 cancels the symbol replica candidates selected by the surviving symbol candidate selector 604 from the (k+1)th received signal $z_{N-k-1}$ from the last.

$$z'_{N-k-1}(\delta q_1 + q_2) = z_{N-k-1} - \sum_{p=1}^{k} r_{N-k-1,N-p} c_{N-p, \prod_p^{(k)}(\delta q_1 + q_2)}$$

(33)

Further, the next stage region detector 610 performs region detection for a signal represented by formula (34), where the result of formula (33) is divided by the (k+1)th diagonal component from the last of the upper triangular matrix R, to determine a region number $\epsilon^{(k+1)}(\delta q_1 + q_2)$ of a region to which $u_{N-k-1}(\delta q_1 + q_2)$ belongs.

$$u_{N-k-1}(\delta q_1+q_2)=z'_{N-k-1}(\delta q_1+q_2)/r_{N-k-1,N-k-1} \quad (34)$$

The metric calculator 608 of the k-th stage processor $510_k$ calculates a cumulative metric as indicated by formula (35).

$$d_k(\delta q_1+q_2)=d_{k-1}(\delta q_1+q_2)+|z'_{N-k}(\delta q_1+q_2)-r_{N-k,N-k}c_{N-k,\Pi_k^{(k)}(\delta q_1+q_2)}|^2 \quad (35)$$

The metric calculator 608 of the k-th stage processor $510_k$ updates the representative metric buffer 614 of the k-th stage processor $510_k$ as indicated by formula (36).

$$E(\mu(q_2)) := d_k(\delta q_1 + q_2)$$
$$\rho(\mu(q_2)) := \rho(\mu(q_2)) + 1$$

(36)

The metric calculator 608 of the k-th stage processor $510_k$ selects surviving paths that satisfy $\rho(i)<m_{N-k}$ and min[E(i)]. Formula (37) is obtained. The metric calculator 608 of the k-th stage processor $510_k$ may also be configured to select surviving paths that satisfy $\rho(i)<m_{N-k}$ and min[E(i)] except surviving paths $\mu((q_2+1) \mod \delta), \mu((q_2+2) \mod \delta), \ldots, \mu((q_2+\delta-1) \mod \delta)$. The surviving paths $\mu((q_2+1) \mod \delta), \mu((q_2+2) \mod \delta), \ldots, \mu((q_2+\delta-1) \mod \delta)$ are excluded because their calculations have not been completed.

$$\mu(q_2) = \underset{\rho(i)<m_{N-k}, i \notin \mu((q_2+1) \mod \delta), \mu((q_2+2) \mod \delta), \ldots, \mu((q_2+\delta-1) \mod \delta)}{\arg} (\min[E(i)]) \quad (37)$$

The metric calculator 608 of the k-th stage processor $510_k$ updates $q_1$ to $q_1:=q_1+1$.

(4) When $q_2<\delta$ is true, the process returns to (2). When $q_2<\delta$ is not true, the process proceeds to (5).

(5) The metric calculator 608 updates $q_1$ to $q_1:=q_1+1$.

(6) When formula (38) is true, the process returns to (1). When formula (38) is not true, the process proceeds to (7).

$$q_1 < \lfloor S_k/\delta \rfloor \quad (38)$$

(7) When $S_k \mod \delta = 0$ is true, the stage process is terminated. When $S_k \mod \delta = 0$ is not true, a remainder process is performed so that $S_k$ surviving candidates are selected.

<Remainder Process>

(8) The metric calculator 608 initializes $q_2$ to $q_2:=0$.

(9) The surviving symbol candidate selector 604 selects a $\rho(\mu(q_2))$th ranked symbol candidate number in surviving paths $\mu(q_2)$ from the symbol ranking table, and determines a $(\delta \lfloor S_k/\delta \rfloor + q_2)$th surviving path of the k-th stage as indicated by formula (40).

$$\delta \lfloor S_k/\delta \rfloor + q_2 \quad (39)$$

$$\prod_{1 \sim k-1}^{(k)} (\delta \lfloor S_k/\delta \rfloor + q_2) = \prod^{(k-1)} (\mu(q_2))$$

$$\prod_k^{(k)} (\delta \lfloor S_k/\delta \rfloor + q_2) = \Omega^{(m_{N-k})}(\varepsilon^{(k)}(\mu(q_2)), \rho(\mu(q_2)))$$

(40)

(10) As indicated by formula (41), the next stage region detector 610 cancels the symbol replica candidates selected by the surviving symbol candidate selector 604 from the (k+1)th received signal $z_{N-k-1}$ from the last.

$$z'_{N-k-1}(\delta \lfloor S_k/\delta \rfloor + q_2) = z_{N-k-1} - \sum_{p=1}^{k} r_{N-k-1,N-p} c_{N-p, \prod_p^{(k)}(\delta \lfloor S_k/\delta \rfloor + q_2)} \quad (41)$$

The next stage region detector 610 performs region detection for a signal represented by formula (42) where the result of formula (41) is divided by the (k+1)th diagonal component from the last of the upper triangular matrix R.

$$u_{N-k-1}(\delta \lfloor S_k/\delta \rfloor + q_2) = z'_{N-k-1}(\delta \lfloor S_k/\delta \rfloor + q_2)/r_{N-k-1,N-k-1} \quad (42)$$

That is, the next stage region detector 610 determines a region number, which is represented by formula (44), of a region to which a signal represented by formula (43) belongs. Here, the next stage region detector 610 is not necessary for the N-th stage processor $510_N$ for the last stage because there is no stage next to the last stage.

$$u_{N-k-1}(\delta \lfloor S_k/\delta \rfloor + q_2) \quad (43)$$

$$\epsilon^{(k+1)}(\delta \lfloor S_k/\delta \rfloor + q_2) \quad (44)$$

The metric calculator 608 calculates a cumulative metric as indicated by formula (45).

$$d_k(\delta \lfloor S_k/\delta \rfloor + q_2) = d_{k-1}(\delta \lfloor S_k/\delta \rfloor + q_2) + |z'_{N-k}(\delta \lfloor S_k/\delta \rfloor + q_2) - r_{N-k,N-k} c_{N-k, \Pi_k^{(k)}(\delta \lfloor S_k/\delta \rfloor + q_2)}|^2 \quad (45)$$

The metric calculator 608 updates parameters as indicated by formula (46).

$$E(\mu(q_2)) := d_k(\delta \lfloor S_k/\delta \rfloor + q_2)$$
$$\rho(\mu(q_2)) := \rho(\mu(q_2)) + 1$$
$$q_2 := q_2 + 1$$

(46)

The metric calculator 608 selects a symbol candidate number ranked $\rho(i_{min})$-th ($i_{min}$ is a value that satisfies $\rho(i)<m_{N-k}$ and min[E(i)]) from the symbol ranking table, and determines the q-th surviving path of the k-th stage as indicated by formula (47).

$$\left.\begin{array}{l}\prod_{1\sim k-1}^{(k)}(q)=\prod^{(k-1)}(i_{min})\\\prod_{k}^{(k)}(q)=\Omega^{(m_{N-k})}(\varepsilon^{(k)}(i_{min}),\rho(i_{min}))\\i_{min}=\underset{\rho(i)\le m_{N-k}}{\arg}\ (\min[E(i)])\end{array}\right\}\quad(47)$$

(11) When $q_2 < S_k$ mod δ is true, the process returns to (9).
(4) When $q_2 < S_k$ mod δ is not true, the process is terminated.

Similar processes are performed up to the N-th stage process.

Figure 11:
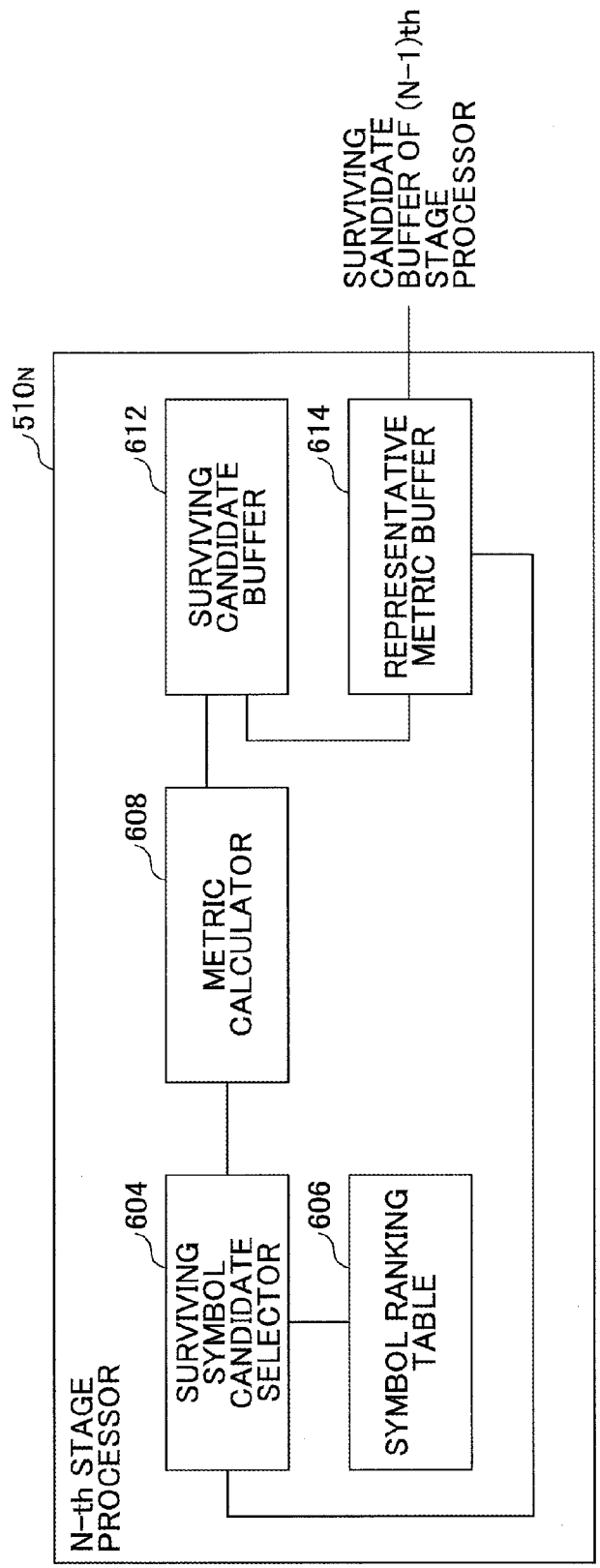
FIG. 11 is a block diagram illustrating an exemplary configuration of an N-th stage processor.

FIG. 11 is a block diagram illustrating an exemplary configuration of the N-th stage processor $510_N$. The N-th stage processor $510_N$ may include a surviving symbol candidate selector 604, a symbol ranking table 606, a metric calculator 608, a surviving candidate buffer 612, and a representative metric buffer 614.

Because there is no stage next to the last stage, the next stage region detector 610 is not necessary for the N-th stage processor $510_N$ for the last stage.

The surviving candidate buffer 612 of the N-th stage processor $510_N$ includes, as elements, cumulative metrics $d_N(i)$ and surviving symbol candidate numbers $\Pi^{(N)}(i)$ of up to the N-th stage.

Unlike the surviving candidate buffer 612 of other stage processors up to the (N−1)th stage processor $510_{N-1}$, it is not necessary to include signals obtained by cancelling surviving symbol replica candidates from a received signal and region numbers in the surviving candidate buffer 612 of the N-th stage processor $510_N$.

Figure 12:
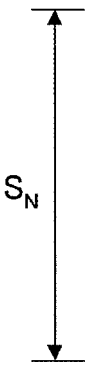
FIG. 12 is a table illustrating an exemplary configuration of a surviving candidate buffer of an N-th stage processor.

FIG. 12 is a table illustrating an exemplary configuration of the surviving candidate buffer 612 of the N-th stage processor $510_N$.

The surviving candidate buffer 612 of the N-th stage processor $510_N$ stores N surviving symbol candidate numbers for each element.

The representative metric buffer 614 of the N-th stage processor $510_N$ includes, as elements, representative metrics $E(i)$, signals $z'_0(i)$ obtained by cancelling surviving symbol replica candidates of up to the previous stage, region numbers $\epsilon^{(N)}(i)$, and cumulative metrics $d_{N-1}(i)$ of up to the previous stage. The representative metric buffer 614 of the N-th stage processor $510_N$ also includes, as elements, surviving symbol candidate numbers $\Pi^{(N-1)}(i)$ of up to the previous stage and current ranks ρ(i).

FIG. 13 is a table illustrating an exemplary configuration of the representative metric buffer 614 of the N-th stage processor $510_N$.

The LLR calculator 512 calculates a bit LLR for each transmission stream. The LLR calculator 512 searches for the smallest one of the cumulative metrics. The LLR calculator 512 determines surviving paths with the smallest cumulative metric as a combination of most-likely symbols. The bit LLR of an n-th bit in an l-th stream $x_l$ is calculated as a difference between a total metric of the combination of most-likely symbols and the smallest one of cumulative metrics of symbols included in the most-likely symbols and having the inverted value of the n-th bit. For example, in the case of formula (48), the bit LLR is expressed by formula (49). In formula (48), l indicates a stream number, bit(x,n) indicates the value of the n-th bit of the stream $x_l$, and invbit(x,n) indicates the inverted value of the n-th bit.

$$\left.\begin{array}{l}\prod^{(N),ML}=\prod^{(N)}(\arg\min[d_N(i)])\\d_{l,min}\left(b_n=bit\left(\prod_l^{(N),ML},n\right)\right)=\min[d_N(i)]\\d_{l,min}\left(b_n=invbit\left(\prod_l^{(N),ML},n\right)\right)=\underset{bit(\Pi_l^{(N)}(i),n)=invbit(\Pi_l^{(N),ML},n)}{\min}[d(i)]\end{array}\right\}\quad(48)$$

$$LLR_l(n) = d_{l,min}(b_n=1) - d_{l,min}(b_n=0) \quad (49)$$

Instead of calculating the bit LLR as a difference between metrics, the bit LLR may be calculated as a difference between square roots of metrics as indicated by formula (50).

$$LLR_l(n) = \sqrt{d_{l,min}(b_n=1)} - \sqrt{d_{l,min}(b_n=0)} \quad (50)$$

<Processes Performed by Receiver>

Figure 14:
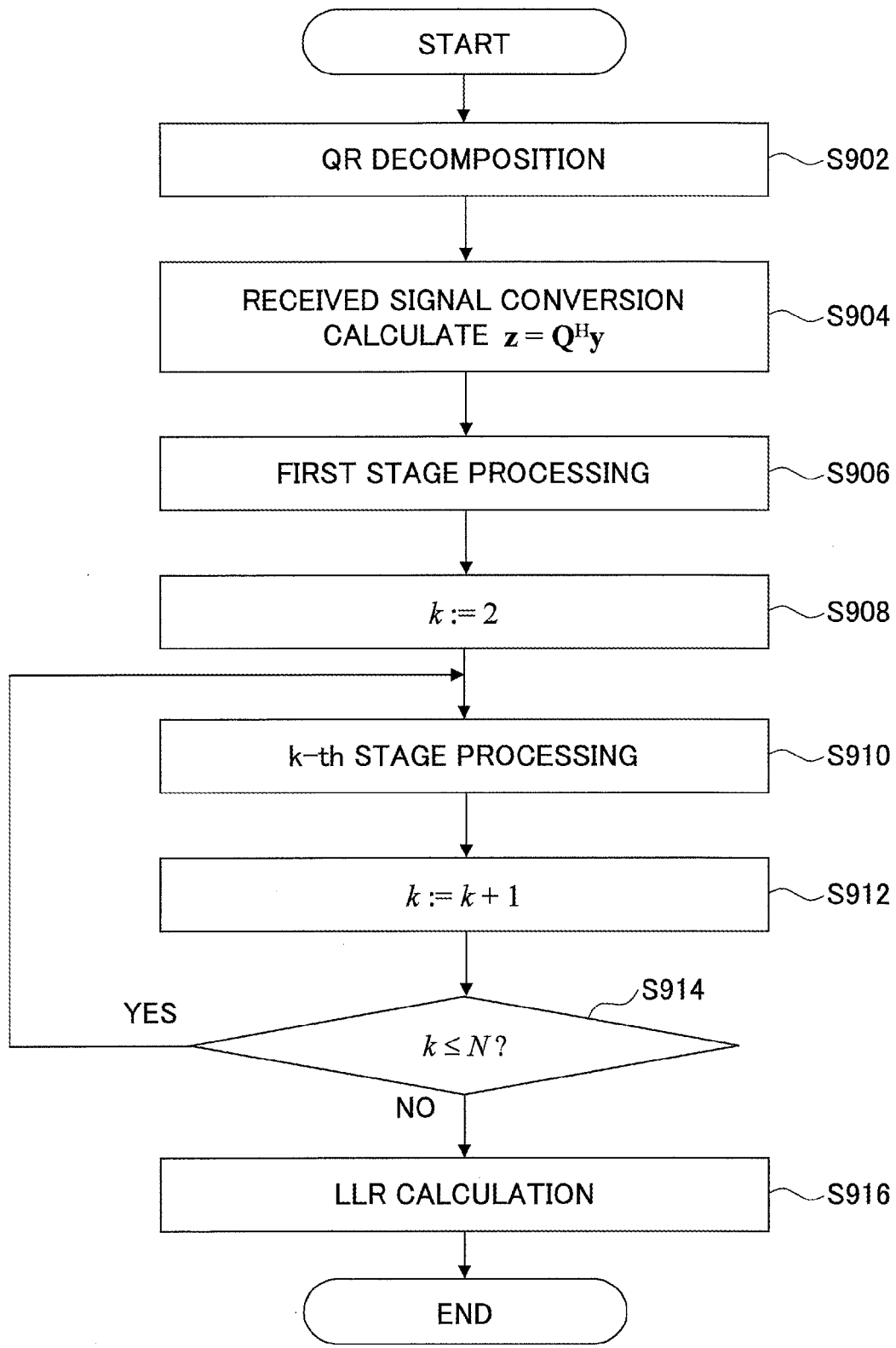
FIG. 14 is a flowchart illustrating an exemplary process performed by a receiver.

FIG. 14 is a flowchart illustrating an exemplary process performed by the receiver 200. FIG. 14 mainly illustrates a process of separating MIMO streams.

At step S902, the QR decomposition processor 504 decomposes a channel matrix H into a unitary matrix Q and an upper triangular matrix R.

At step S904, the received signal converter 506 multiplies a received signal vector y by the Hermitian conjugate of the unitary matrix Q to obtain $z=Q^H y$.

At step S906, the MIMO demodulator 508 performs a first stage process.

At step S908, the MIMO demodulator 508 updates k to k:=2.

At step S910, the MIMO demodulator 508 performs a k-th stage process.

At step S912, the MIMO demodulator 508 updates k to k:=k+1.

At step S914, the MIMO demodulator 508 determines whether k≤N is true.

When k≤N is true at step S914, the process returns to step S910.

When k≤N is not true at step S914, the process proceeds to step S916. At step S916, the LLR calculator 512 calculates LLRs and the process is terminated.

Figure 15:
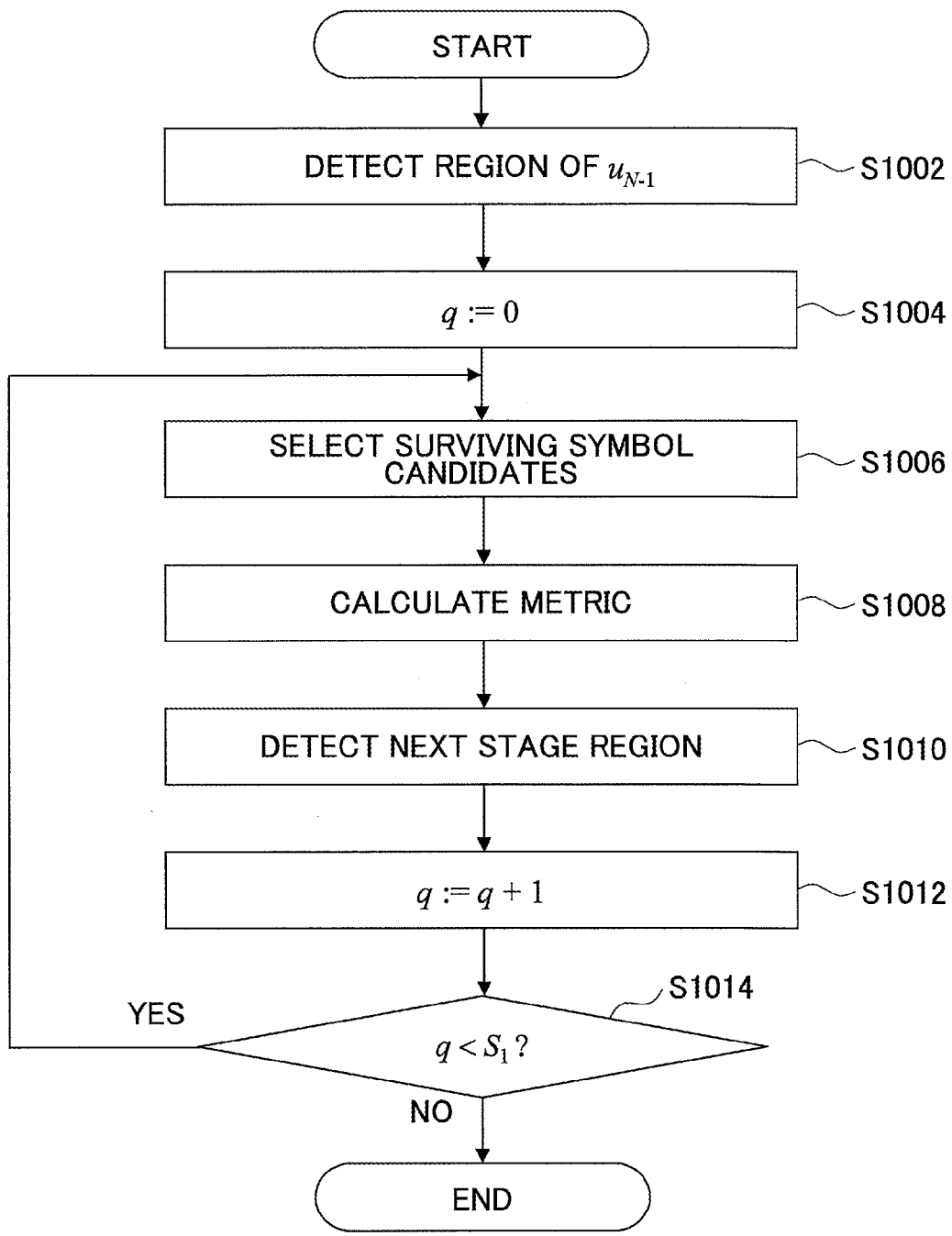
FIG. 15 is a flowchart illustrating an exemplary process performed by a receiver.

FIG. 15 is a flowchart illustrating an exemplary process performed by the receiver 200. FIG. 15 mainly illustrates a process performed by the first stage processor $510_1$.

At step S1002, the region detector 602 detects a region $\epsilon^{(1)}$ to which $u_{N-1}$ belongs.

At step S1004, the surviving symbol candidate selector 604 updates q to q:=0.

At step S1006, the surviving symbol candidate selector 604 selects a surviving symbol candidate.

At step S1008, the metric calculator 608 calculates a metric.

At step S1010, the next stage region detector 610 detects a next stage region.

At step S1012, the surviving symbol candidate selector 604 updates q to q:=q+1.

At step S1014, the surviving symbol candidate selector 604 determines whether $q<S_1$ is true.

When $q<S_1$ is true at step S1014, the process returns to step S1006.

When $q<S_1$ is not true at step S1014, the process is terminated.

Figure 16:
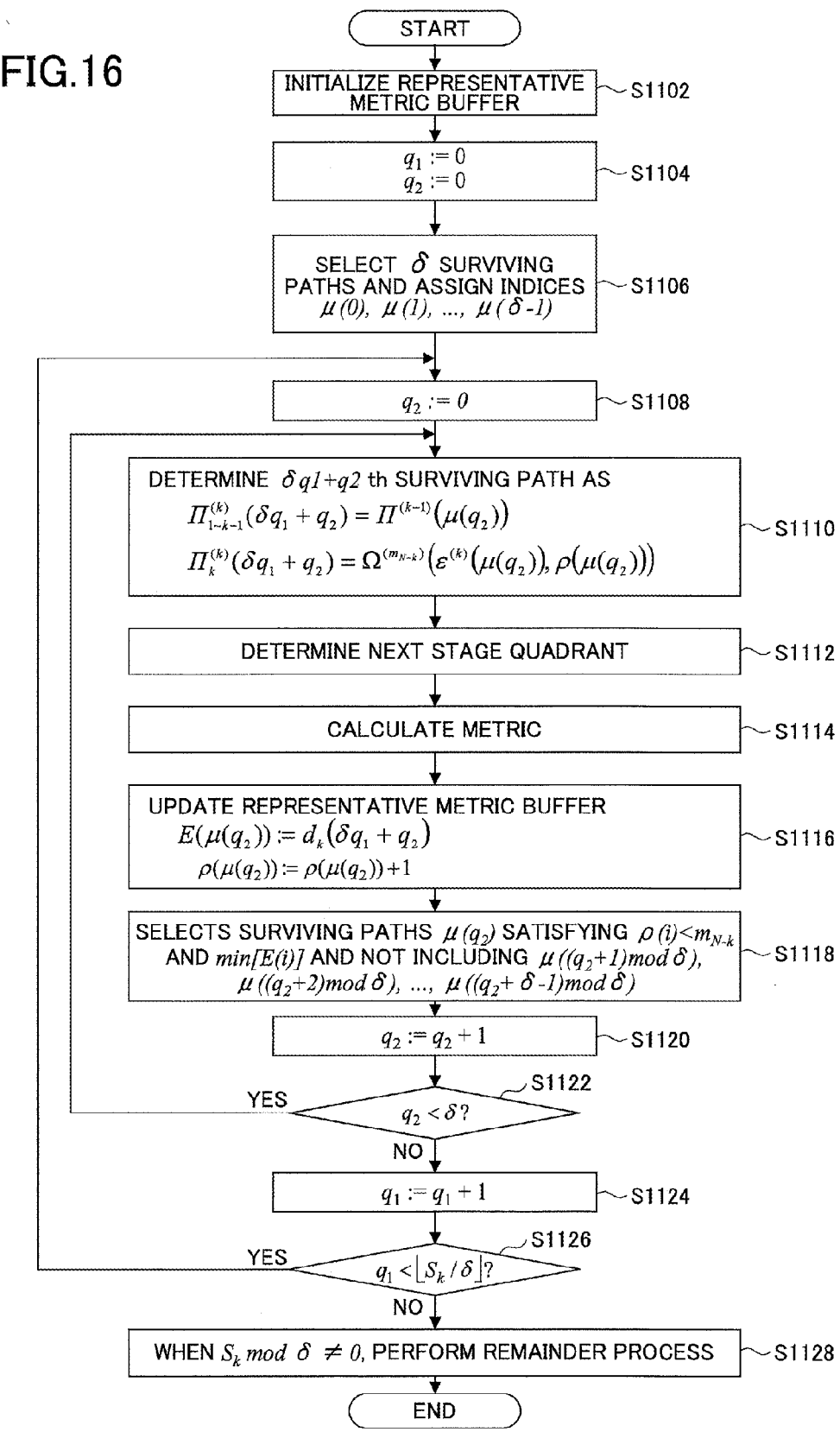
FIG. 16 is a flowchart illustrating an exemplary process performed by a receiver.

FIG. 16 is a flowchart illustrating an exemplary process performed by the receiver 200. FIG. 16 mainly illustrates a process performed by the k-th stage processor $510_k$ (k=2, 3, . . . , N).

At step S1102, the representative metric buffer 614 is initialized.

At step S1104, the surviving symbol candidate selector 604 updates $q_1$ to $q_1:=0$ and $q_2$ to $q_2:=0$. Here, $q_1$ and $q_2$ are parameters indicating loop counts.

At step S1106, the surviving symbol candidate selector 604 selects first (or top) δ surviving paths (δ indicates a number) in ascending order of representative metrics E(i), and assigns indices μ(0), μ(1), . . . , μ(δ−1) to the selected surviving paths.

At step S1108, the surviving symbol candidate selector 604 updates $q_2$ to $q_2:=0$.

At step S1110, the surviving symbol candidate selector 604 determines a $(\delta q_1+q_2)$th surviving path as $\Pi^{(k)}_{1-k-1}(\delta q_1+q_2)=\Pi^{(k-1)}_{(\mu(q2))})$ and $\Pi^{(k)}_k(\delta q_1+q_2)=\Omega^{(mN-k)}(\epsilon^{(k)}(\mu(q_2)), \rho(\mu(q_2)))$.

At step S1112, the next stage region detector 610 determines a next stage quadrant.

At step S1114, the metric calculator 608 calculates a metric.

At step S1116, the representative metric buffer 614 is updated to $E(\mu(q_2)):=d_k(\delta q_1+q_2)$ and $\rho(\mu(q_2)):=\rho(\mu(q_2))+1$.

At step S1118, the metric calculator 608 selects surviving paths $\mu(q_2)$ that satisfy $\rho(i)<m_{N-k}$ and min[E(i)] and do not include $\mu((q_2+1) \bmod \delta), \mu((q_2+2) \bmod \delta), \ldots, \mu((q_2+\delta-1) \bmod \delta)$. That is, the metric calculator 608 selects surviving paths that satisfy $\rho(i)<m_{N-k}$ and min[E(i)] except surviving paths whose calculations have not been completed.

At step S1120, the surviving symbol candidate selector 604 updates $q_2$ to $q_2:=q_2+1$.

At step S1122, the surviving symbol candidate selector 604 determines whether $q_2<\delta$ is true.

When $q_2<\delta$ is true at step S1122, the process returns to step S1110.

When $q_2<\delta$ is not true at step S1122, the process proceeds to step S1124. At step S1124, the surviving symbol candidate selector 604 updates $q_1$ to $q_1:=q_1+1$.

At step S1126, the surviving symbol candidate selector 604 determines whether formula (51) is true.

$$q_1 < \lfloor S_k/\delta \rfloor \quad (51)$$

When formula (51) is true at step S1126, the process returns to step S1108.

When formula (51) is not true at step S1126, the process proceeds to step S1128. At step S1128, the surviving symbol candidate selector 604 performs a remainder process when $S_k \bmod \delta$ is not 0.

Figure 17:
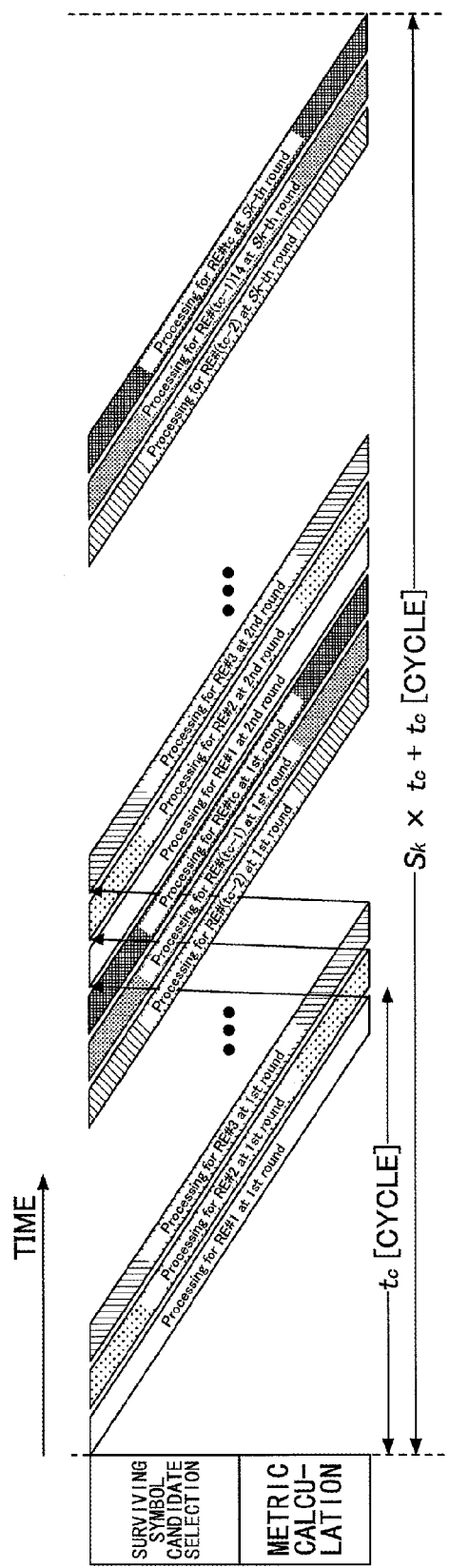
FIG. 17 is a timing chart illustrating an exemplary process performed by a receiver.

FIG. 17 is a timing chart illustrating an exemplary process performed by the receiver 200. In FIG. 17, processes for resource elements (RE) are pipelined. As illustrated by FIG. 17, processes for each of "tc" REs (tc indicates the number of REs) are executed at an interval of one cycle (tc) to efficiently use hardware resources.

That is, the representative metric is updated each time the cumulative metric is calculated, surviving symbol candidates are selected from surviving paths whose representative metric is the smallest and whose current rank is less than or equal to the modulation level of the current stage, and then the representative metric is calculated. Selecting the surviving symbol candidates makes it possible to reduce the processing load.

With this method, however, a memory for storing data necessary to select surviving symbol candidates and a memory for storing data to be passed along to the next stage are necessary. The former memory is referred to as a "representative metric buffer" and the latter is referred to as a "surviving candidate buffer".

The representative metric buffer stores, for respective surviving paths of up to the previous stage, elements such as representative metrics, signals obtained by cancelling surviving symbol replica candidates of up to the previous stage, region numbers, cumulative metrics of up to the previous stage, surviving symbol candidate numbers of up to the previous stage, and current ranks. The number of elements corresponds to the number of surviving candidates of the previous stage.

The surviving candidate buffer stores elements such as cumulative metrics, signals obtained by cancelling surviving symbol replica candidates of up to the current stage, region numbers, and surviving symbol candidate numbers of up to the current stage. The number of elements corresponds to the number of surviving candidates of the current stage.

These data items need to be retained from the start to the end of each stage. Therefore, in the case of FIG. 17, memories that can store data for the tc REs need to be provided and this may result in an increased circuit size.

Here, in the k-th stage process illustrated by FIG. 16, metrics of candidates that satisfy $\rho(i)<m_{N-k}$ and min[E(i)] in the representative metric buffer updated in the $(\delta q_1+q_2)$th process of the loop are calculated in the $(\delta q_1+q_2+\delta)$th process.

Figure 18:
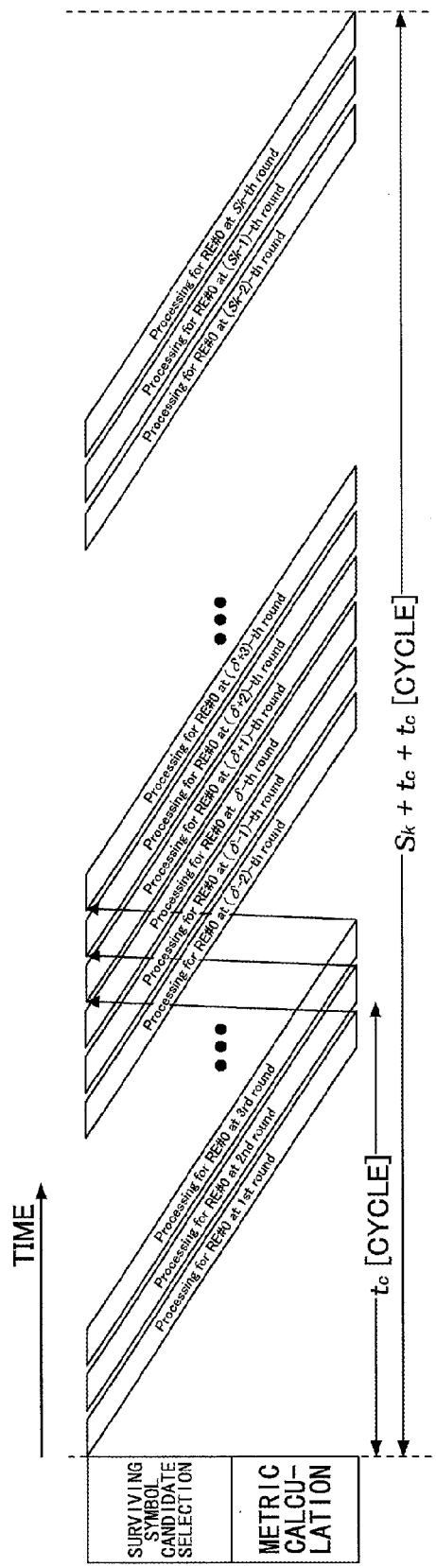
FIG. 18 is a timing chart illustrating an exemplary process performed by a receiver.

FIG. 18 is a timing chart illustrating an exemplary process performed by the receiver 200. In FIG. 18, δ is set at $t_c$ ($\delta=t_c$) and processes for the same RE are pipelined.

According to the method of FIG. 18, the processing time for one RE is reduced to $S_k+t_c+t_c$ [cycle]. Accordingly, with this method, only a surviving candidate buffer and a representative metric buffer for one RE need to be provided for $S_k+t_c+t_c$ [cycle]. Thus, this method makes it possible to reduce the amount of memory required.

Also, the receiver 200 may include surviving candidate buffers and representative metric buffers for two REs.

Figure 19:
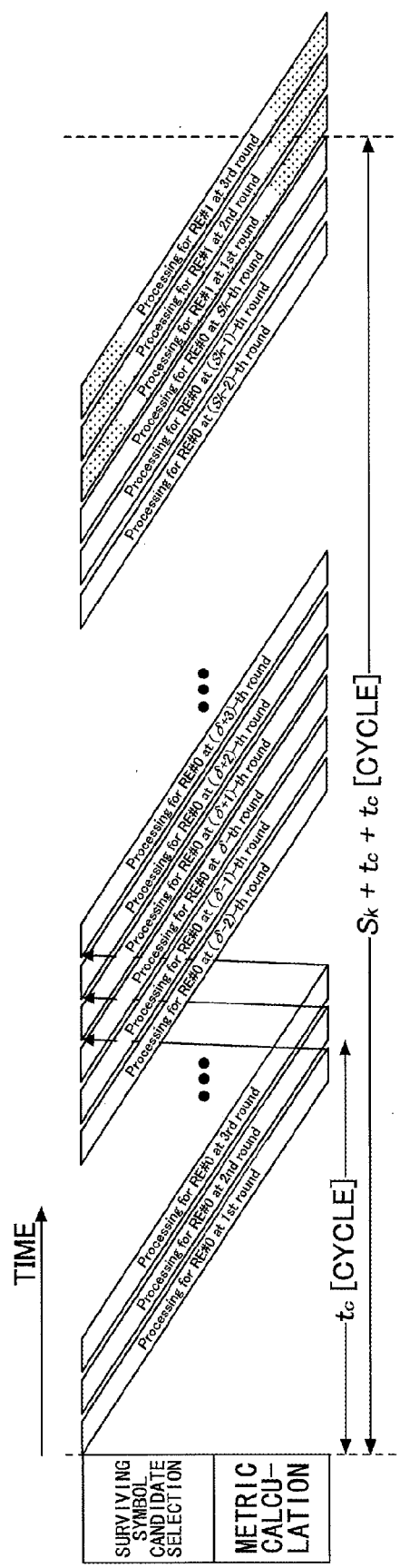
FIG. 19 is a timing chart illustrating an exemplary process performed by a receiver.

FIG. 19 is a timing chart illustrating an exemplary process performed by the receiver 200. In FIG. 19, δ is set at $t_c$ ($\delta=t_c$) and processes for the same RE are pipelined. In this case, it is assumed that the receiver 200 includes surviving candidate buffers and representative metric buffers for two REs. The method of FIG. 19 makes it possible to reduce the amount of memory required and also makes it possible to start a process for a next RE before a process for a current RE is completed, i.e., to efficiently use hardware resources.

With the receiver 200 of the above embodiments, it may not be possible to select a surviving path with the smallest representative cumulative metric each time. When the value of δ is large, this may reduce the demodulation performance.

For this reason, instead of pipelining processes of one RE, processes of $N_{RE}$ REs ($N_{RE}$ indicates the number of REs) may be pipelined or multiplexed. This method makes it possible to prevent the value of δ from increasing. In this case, δ is represented by formula (52).

$$\delta = \lceil t_c/N_{RE} \rceil \quad (52)$$

Because the number of REs becomes $N_{RE}$, this method is less effective in reducing the amount of memory compared with the above described method where processes of one RE are pipelined. However, this method makes it possible to prevent the value of δ from increasing and thereby makes it possible to prevent degradation of the demodulation performance. Accordingly, δ and $N_{RE}$ are preferably determined taking into account the trade-off between the memory amount reduction effect and the demodulation performance.

Figure 20:
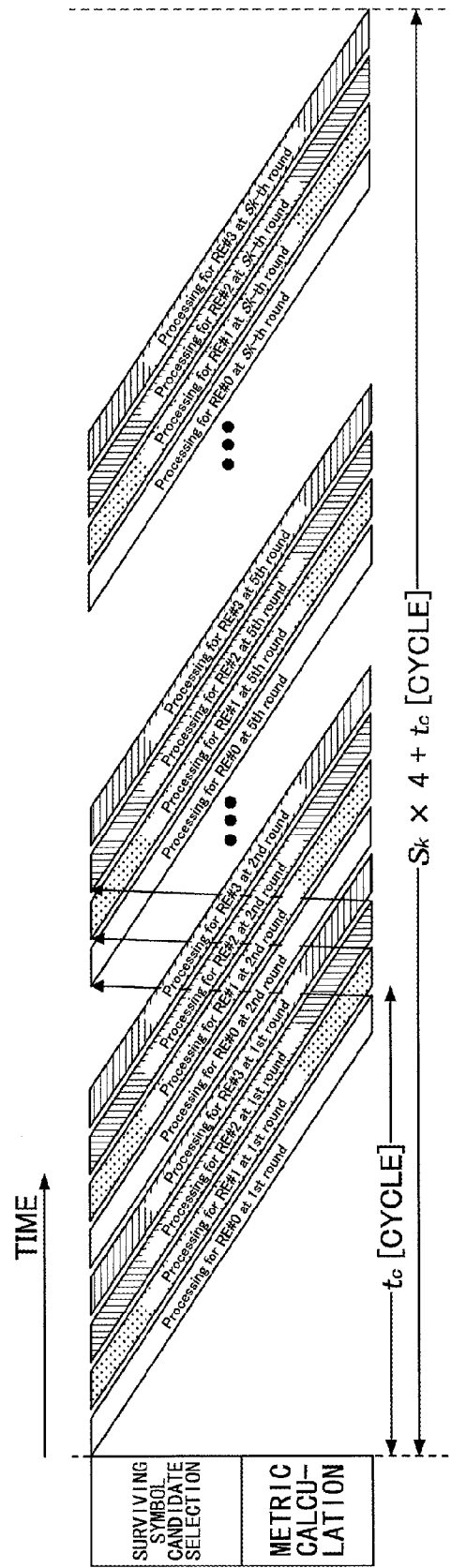
FIG. 20 is a timing chart illustrating an exemplary process performed by a receiver.

FIG. 20 is a timing chart illustrating an exemplary process performed by the receiver 200. In FIG. 20, $N_{RE}$ is set at 4.

<Region Detection Process>

An exemplary region detection process is described below. The region detection process is performed mainly by the region detector 602 and the next stage region detector 610.

Because the region detection process is substantially the same in all stages, in the descriptions below, a signal for which region detection is performed is indicated by "u" without using a subscript. In a first quadrant detection step, the signs (i.e., positive or negative) of the real part and the imaginary part of $u^{(1)}=u$ are determined to detect a quadrant to which $u^{(1)}$ belongs. In a second quadrant detection step, the origin of $u^{(1)}$ is moved to the center (sign{Re(u)}·$\chi_{mod}$, sign{Im(u)}·$\chi_{mod}$) of the quadrant detected in the first quadrant detection step (the resulting signal is indicated by $u^{(2)}$), and a quadrant to which $u^{(2)}$ belongs is detected. Here, it is assumed that formula (53) is true.

$$X_{mod} = \begin{cases} 1/\sqrt{2}, \text{ for } QPSK \\ 2/\sqrt{10}, \text{ for } 16QAM \\ 4/\sqrt{42}, \text{ for } 64QAM \end{cases} \quad (53)$$

$$\text{sign}(x) = \begin{cases} 1, x \geq 0 \\ -1, x < 0 \end{cases}$$

In a t-th quadrant detection step, the origin of $u^{(t-1)}$ is moved to the center indicated by formula (54) of the quadrant detected in a (t−1)th quadrant detection step (the resulting signal is indicated by $u^{(t)}$), and a quadrant to which $u^{(t)}$ belongs is detected. The quadrant detection step is repeated $N_{div}$ times to determine one of $N_{area}$ regions ($N_{area}$ is a number indicated by formula (55)) to which the signal belongs.

$$\left( \sum_{p=1}^{t-1} \text{sign}\{\text{Re}(u^{(p)})\} \cdot X_{mod}/2^{p-1}, \sum_{p=1}^{t-1} \text{sign}\{\text{Im}(u^{(p)})\} \cdot X_{mod}/2^{p-1} \right) \quad (54)$$

$$N_{area} = 2^{2N_{div}} \quad (55)$$

Figure 21:
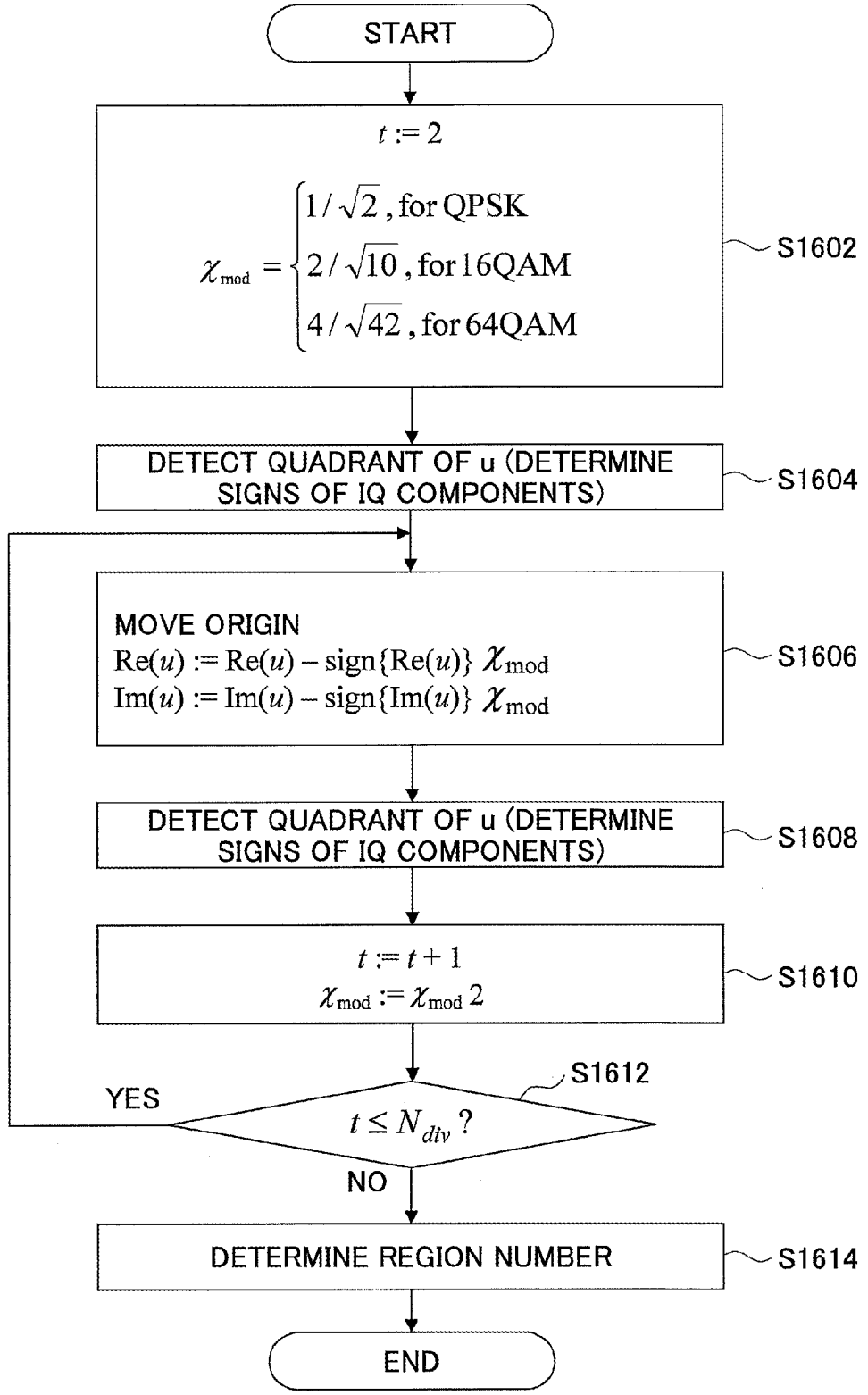
FIG. 21 is a flowchart illustrating an exemplary region detection process.

FIG. 21 is a flowchart illustrating an exemplary region detection process. The region detection process of FIG. 21 is performed mainly by the region detector 602 and the next stage region detector 610.

At step S1602, t is set at t:=2. Also, $\chi_{mod}$ is set at $1/\sqrt{2}$ when QPSK is used, at $2/\sqrt{10}$ when 16QAM is used, or at $4/\sqrt{42}$ when 64QAM is used.

At step 1604, the quadrant of u is detected. More specifically, the quadrant of u is detected by determining the signs of IQ components.

At step S1606, the origin is moved to the center of the quadrant detected at step S1604. The movement of the origin is represented by Re(u):=Re(u)−sign{Re(u)}×$\chi_{mod}$ and Im(u):=Im(u)−sign{Im(u)}×$\chi_{mod}$.

At step 1608, the quadrant of u is detected again. More specifically, the quadrant of u is detected by determining the signs of IQ components.

At step S1610, t is set at t:=t+1. Also, $\chi_{mod}$ is set at $\chi_{mod}:=\chi_{mod}/2$.

At step S1612, whether t≤$N_{div}$ is true is determined.

When t≤$N_{div}$ is true, the process returns to step S1606.

When t≤$N_{div}$ is not true at step S1612, the process proceeds to step S1614. At step S1614, a region number is determined and the process is terminated.

Figure 22:
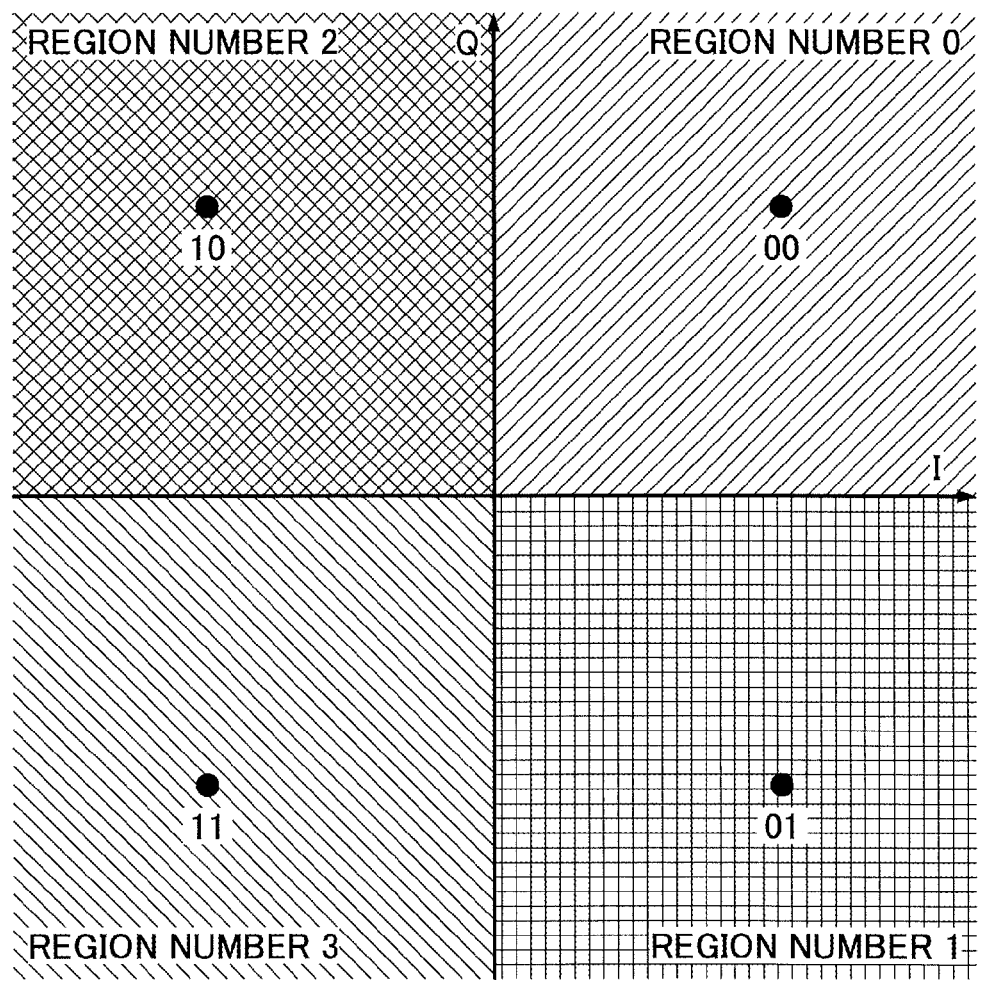
FIG. 22 is a drawing illustrating exemplary assignment of region numbers.

FIG. 22 is a drawing illustrating exemplary assignment of region numbers. In FIG. 22, it is assumed that QPSK is used and $N_{div}$ is 1.

FIG. 23 is an example of a symbol ranking table.

In the example of FIG. 23, the symbol ranking table includes, for each region (or region number), symbol numbers that are arranged in ascending order of distance between a representative point of the region and symbols. The representative point of each region may be the position of a symbol in the region. For example, the representative point may be expressed by formula (56) using the region number ε.

$$\left( \sum_{p=1}^{N_{div}} \text{bit\_sign}(\varepsilon, 2p-1) \cdot X_{mod}/2^{p-1}, \right. \quad (56)$$

$$\left. \sum_{p=1}^{N_{div}} \text{bit\_sign}(\varepsilon, 2p) \cdot X_{mod}/2^{p-1} \right)$$

In formula (56), it is assumed that formula (57) is true.

$$\text{bit\_sign}(\varepsilon, n) = \begin{cases} 1, \text{bit}(\varepsilon, n) = 0 \\ -1, \text{bit}(\varepsilon, n) = 1 \end{cases} \quad (57)$$

In formula (57), bit(ε,n) indicates a value of an n(1~$2N_{div}$) th bit from the most significant bit (MSB) of the region number ε that has a width of $2N_{div}$ bits. In this case, the representative point of each region is the same as the position of a symbol belonging to the region.

Here, when $N_{div}$=1, it is not possible to determine the second closest symbol and the third closest symbol to the representative point of the region. For example, in the case of region 0, it is not possible to determine which one of 10 (decimal number: 2) and 01 (decimal number: 1) is closer to the representative point. For this reason, a table defining the second and third closest symbols may be prepared and stored beforehand.

Region numbers may also be assigned to the regions by any other method. When a different method is used to assign the region numbers, the symbol ranking table of FIG. 23 is also changed accordingly.

Thus, when QPSK is used and $N_{div}$ is 1, symbols that are the second closest and the third closest to the representative point of a region can be determined based on a predefined table.

The accuracy of ranking can be improved by increasing $N_{div}$ indicating the number of quadrant detection times.

Figure 24:
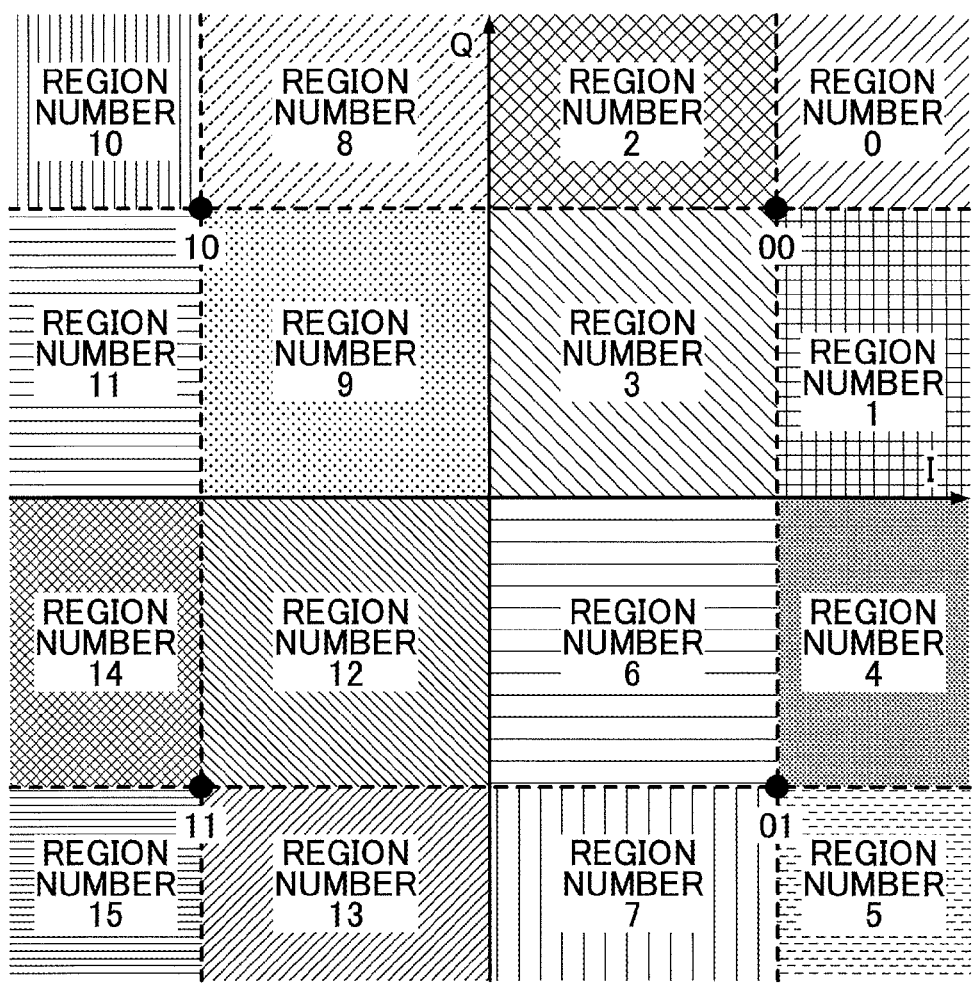
FIG. 24 is a drawing illustrating exemplary assignment of region numbers.

FIG. 24 is a drawing illustrating exemplary assignment of region numbers. In FIG. 24, it is assumed that QPSK is used and $N_{div}$ is 2. In this case, the representative point of each region is expressed by ($\pm\{1,3\}/2\sqrt{10}, \pm\{1,3\}/2\sqrt{2}$).

FIG. 25 is an example of a symbol ranking table.

As indicated by FIG. 25, for each of region numbers 1, 2, 4, 7, 8, 11, 13, and 14, it is possible to determine the second closest symbol and the third closest symbol to the representative point of the corresponding region. The method of FIGS. 24 and 25 makes it possible to improve the accuracy of the symbol ranking table.

Figure 26:
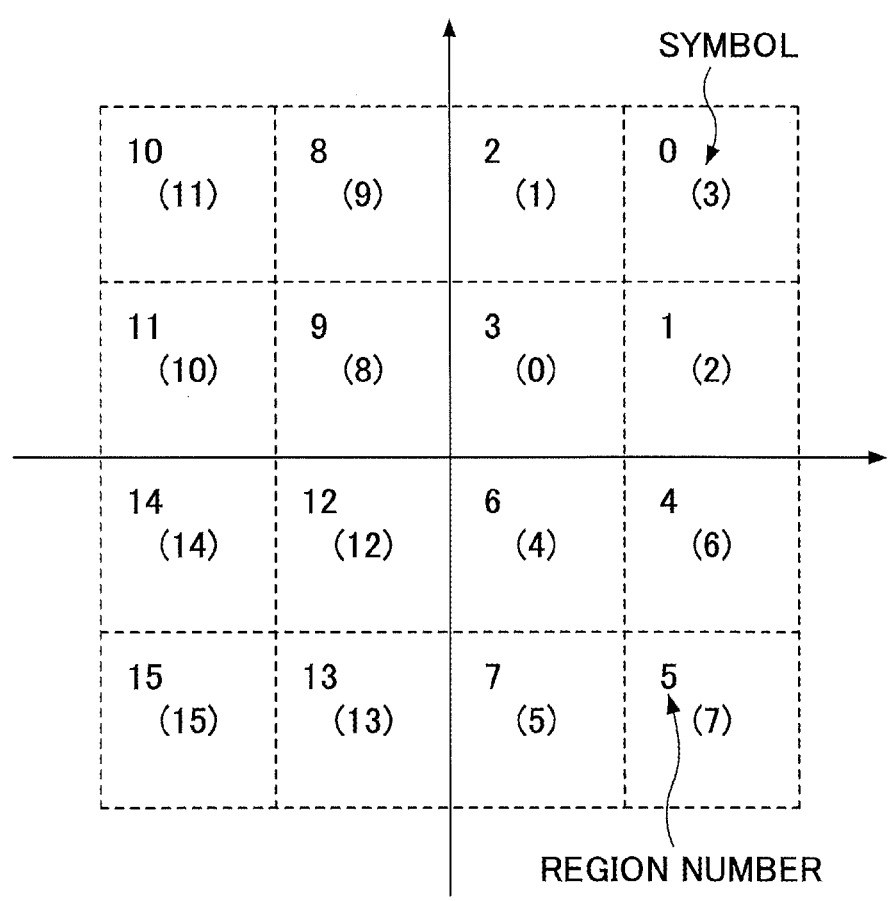
FIG. 26 is a drawing illustrating exemplary assignment of region numbers.

FIG. 26 is a drawing illustrating exemplary assignment of region numbers. In FIG. 26, it is assumed that 16QAM is used and $N_{div}$ is 2.

FIG. 27 is an example of a symbol ranking table.

In FIG. 26, the number in brackets in each region indicates a symbol number (which is obtained by converting a bit sequence into a decimal number). In this case, the representative point of each region is the same as the position of a symbol in the region.

Figure 28:
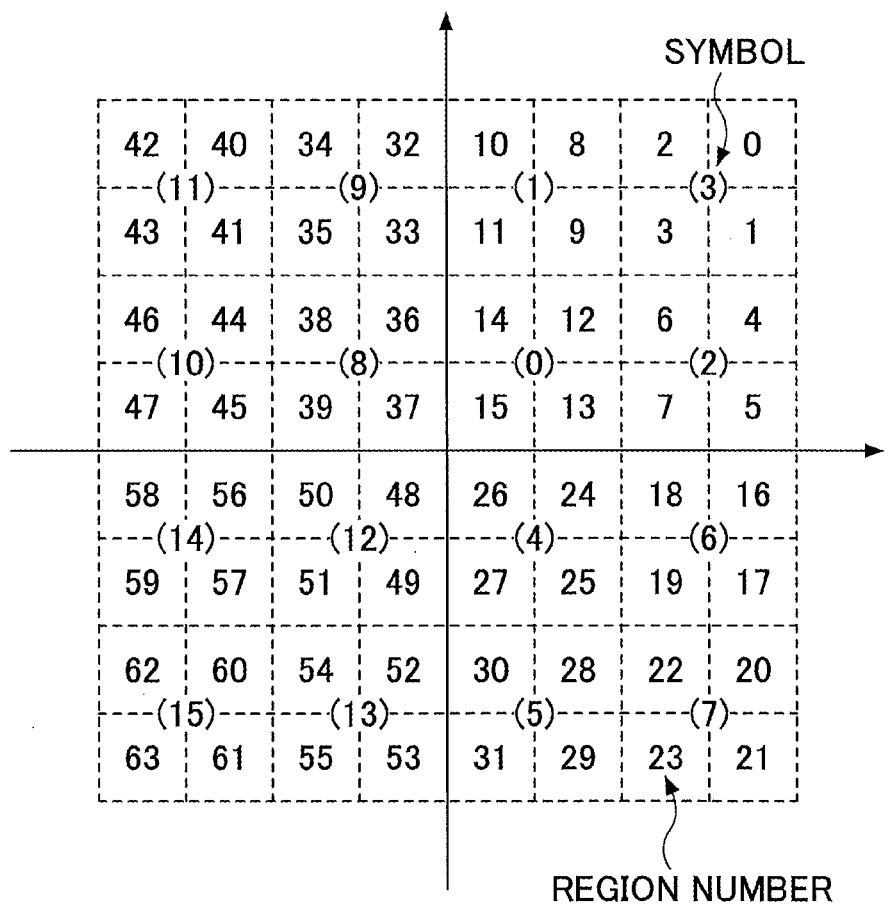
FIG. 28 is a drawing illustrating exemplary assignment of region numbers.

FIG. 28 is a drawing illustrating exemplary assignment of region numbers. In FIG. 28, it is assumed that 16QAM is used and $N_{div}$ is 3.

FIG. 29 is an example of a symbol ranking table.

In this case, the representative point of each region is expressed by $(\pm\{1,3,5,7\}/2\sqrt{10}, \pm\{1,3,5,7\}/2\sqrt{10})$.

Figure 30:
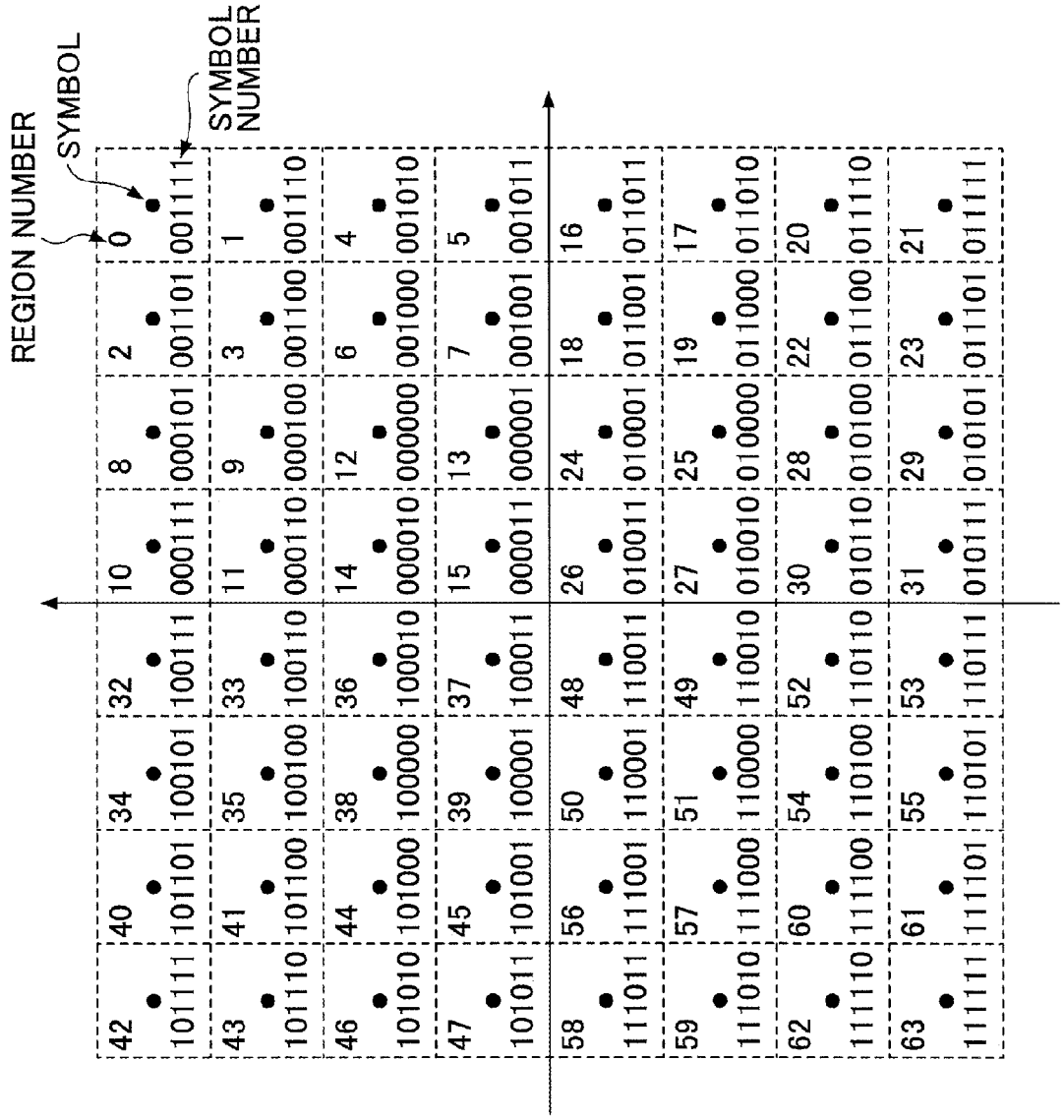
FIG. 30 is a drawing illustrating exemplary assignment of region numbers.

FIG. 30 is a drawing illustrating exemplary assignment of region numbers. In FIG. 30, it is assumed that 64QAM is used and $N_{div}$ is 3.

Figure 31:
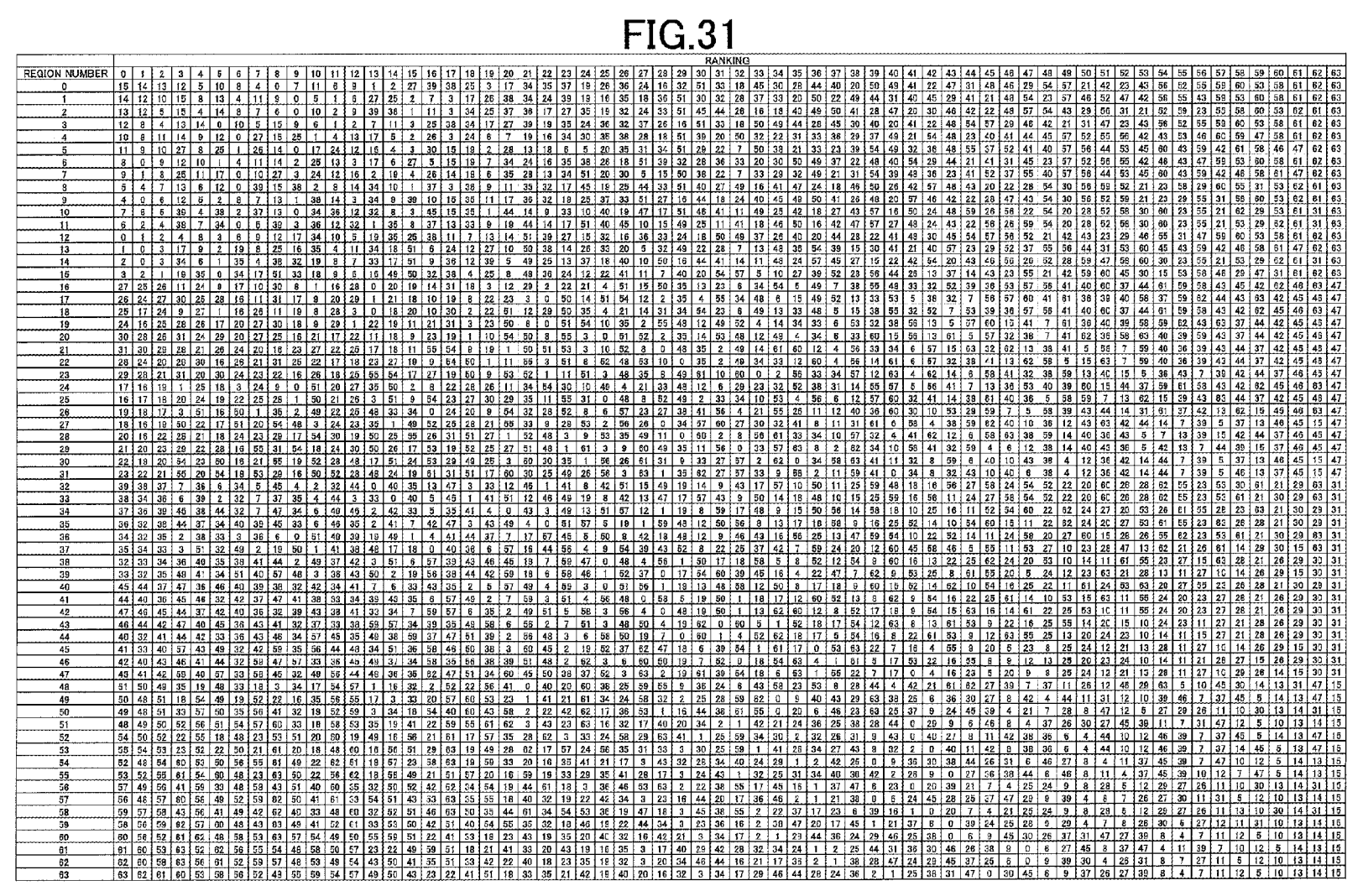

FIG. 31 is an example of a symbol ranking table.

In this case, the representative point of each region is the same as the position of a symbol in the region.

An exemplary region detection method is described below.

Figure 32:
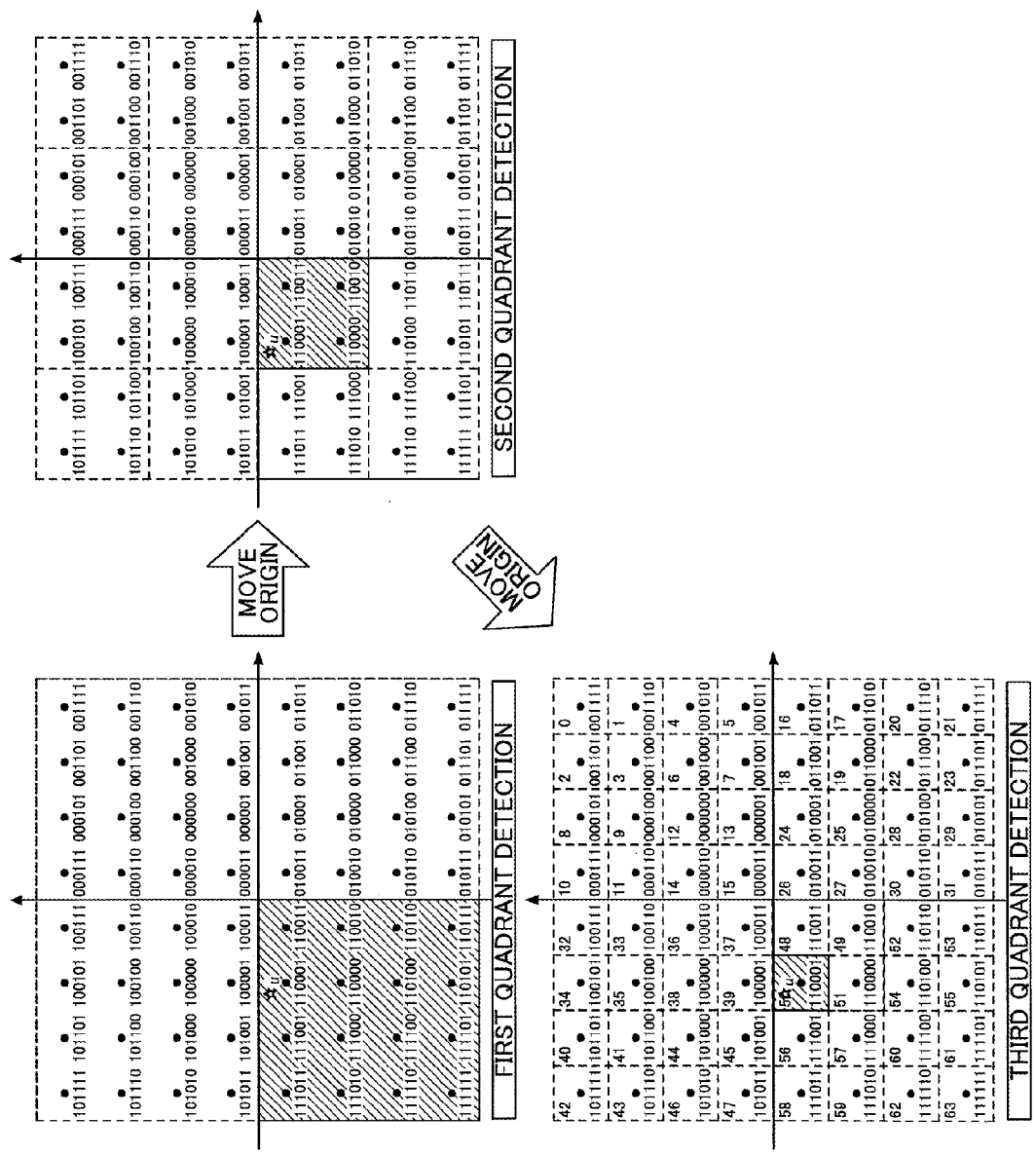
FIG. 32 is a drawing used to describe an exemplary region detection method.

FIG. 32 is a drawing used to describe an exemplary region detection method. In FIG. 32, it is assumed that 64QAM is used and $N_{div}$ is 3. Also in FIG. 32, the signal u is indicated by a star sign "☆". The method described below may also be applied to a case where a different modulation scheme is used.

In FIG. 32, each quadrant is divided into 16 regions and the total number of regions of four quadrants is 64. Here, the region number of each region is represented by the number of a signal point in the region.

In the first quadrant detection step, it is determined that the signal u belongs to the fourth quadrant because both the real part and the imaginary part of the signal u are negative.

Next, because the fourth quadrant is detected in the first quadrant detection step, the origin is moved to $(-4\sqrt{42}, -4\sqrt{42})$. The movement of the origin can be done by subtracting the coordinates of the next origin from the signal u: $u^{(2)}=\{Re(u)+4\sqrt{42}\}+j\{Im(u)+4\sqrt{42}\}$.

Also in the second quadrant detection step, the signs of the real part and the imaginary part of signal $u^{(2)}$ are determined. As a result, the first quadrant is detected. Similarly to the first quadrant detection step, the origin is moved to $(-2\sqrt{42}, -2\sqrt{42})$.

Then, a third quadrant detection step is performed and the third quadrant is detected. As a result, it is determined that the signal u belongs to a region with a region number 50.

First Variation

According to a first variation of the receiver 200, the process performed by the k-th stage processor $510_k$ is different from that in the above embodiment.

Figure 33:
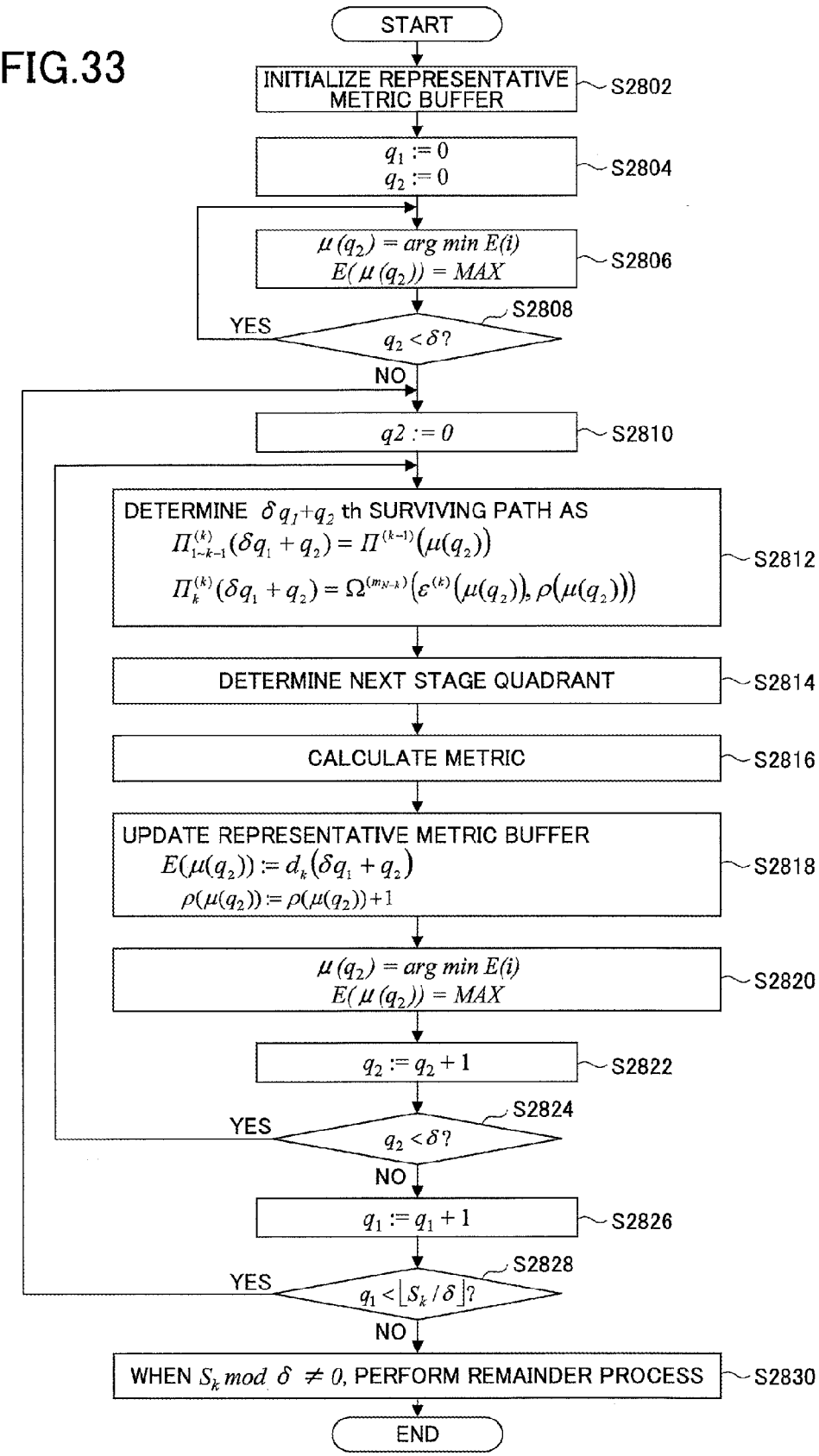
FIG. 33 is a flowchart illustrating a variation of a process performed by a receiver.

FIG. 33 is a flowchart illustrating a variation of a process performed by the receiver 200. FIG. 33 mainly illustrates a process performed by the k-th stage processor $510_k$ (k=2, 3, ..., N).

Steps S2802 and S2804 are substantially the same as steps S1102 and S1104 of FIG. 16.

At step S2806, the surviving symbol candidate selector 604 sets $\mu(q_2)$=arg minE(i) and $E(\mu(q_2))$=MAX.

At step S2808, the surviving symbol candidate selector 604 determines whether $q_2<\delta$ is true.

When $q_2<\delta$ is true at step S2808, the process returns to step S2806.

When $q_2<\delta$ is not true at step S2808, the process proceeds to step S2810. At step S2810, the surviving symbol candidate selector 604 updates $q_2$ to $q_2:=0$.

Steps S2812 through S2818 are substantially the same as steps S1110 through S1116 of FIG. 16.

At step S2820, the surviving symbol candidate selector 604 sets $\mu(q_2)$=arg minE(i) and $E(\mu(q_2))$=MAX.

Steps S2822 through S2830 are substantially the same as steps S1120 through S1128 of FIG. 16.

In the above embodiment, the surviving symbol candidate selector 604 selects first (or top) $\delta$ surviving paths in ascending order of representative metrics E(i) as an initial process and the metric calculator 608 selects surviving paths $\mu(q_2)$ that satisfy $\rho(i)<m_{N-k}$ and min[E(i)] in each loop indicated by $q_2$.

On the other hand, at step S2806 in the process of the first variation, the surviving symbol candidate selector 604 updates the selected smallest representative metric to MAX. In general, when the process is implemented by a processor or dedicated hardware, the representative metric is expressed by a fixed-point or floating-point value with a finite bit width. MAX indicates the maximum value that can be expressed in this format. For example, when the representative metric is expressed by a 16-bit unsigned fixed-point value, 0xFFFF is the maximum value. Thus, updating the smallest representative metric to MAX makes it easier to search for surviving paths satisfying min[E(i)] and not including $\mu((q_2+1) \mod \delta)$, $\mu((q_2+2) \mod \delta)$, ..., $\mu((q_2+\delta-1) \mod \delta)$.

Second Variation

A second variation of the receiver 200 is described below.

The receiver 200 of the second variation uses a symbol ranking table that is different from the above-described embodiments and variations.

In the above-described embodiments and variations, a surviving path that is selected once is excluded from selection candidates until the loop is executed $\delta$ times. Therefore, the same surviving path is selected only a number of times indicated by formula (58) at the maximum.

$$\min(\lceil S_k/\delta \rceil, m_{N-k}) \tag{58}$$

Accordingly, the current rank at the end of a stage is represented by formula (59).

$$\rho(i) \leq \min(\lceil S_k/\delta \rceil, m_{N-k}) \tag{59}$$

Here, when formula (60) is true, only a part of the symbol ranking table corresponding to ranking numbers that are smaller than formula (61) needs to be retained.

$$\lceil S_k/\delta \rceil < m_{N-k} \tag{60}$$

$$\lceil S_k/\delta \rceil \tag{61}$$

Retaining only a part of the symbol ranking table corresponding to ranking numbers that are smaller than formula (61) makes it possible to reduce the size of the symbol ranking table.

For example, when $S_k=16$ and $\delta=4$, the result of formula (61) becomes 4 as indicated by formula (62).

$$\lceil S_k/\delta \rceil = 4 \tag{62}$$

FIG. 34 is an example of the symbol ranking table 606. In FIG. 34, it is assumed that 16QAM is used and $N_{div}$ is 2. The second variation may also be applied to a case where a different modulation scheme is used.

When the largest value of the current rank in the representative metric buffer 614 is $\min(S_k, m_{N-k})$, the bit width is $\log_2\{\min(S_k, m_{N-k})\}$.

According to the second variation, the bit width becomes as indicated by formula (63). Thus, the second variation makes it possible to reduce the amount of memory for the representative metric buffer 614.

$$\log_2 \lceil S_k/\delta \rceil \quad (63)$$

Third Variation

A third variation of the receiver 200 is described below.

The receiver 200 of the third variation uses a symbol ranking table that is different from the above embodiment and the variations.

In above-described embodiments and variations, the surviving symbol candidate selector 604 selects first (or top) δ surviving paths in ascending order of representative metrics E(i) as an initial process. The selected δ surviving paths are different from each other.

According to the third variation, duplicate surviving paths may exist in the selected δ surviving paths. In the third variation, $\Delta_0$ surviving paths with the smallest E(i), $\Delta_1$ surviving paths with the second smallest E(i), and $\Delta_{\alpha-1}$ surviving paths with the ($\alpha$−1)th smallest E(i) are selected. The total number of selected surviving paths is δ as indicated by formula (64).

$$\sum_{i=0}^{\alpha-1} \Delta_i = \delta \quad (64)$$

According to an aspect of this disclosure, first (or top) δ surviving paths are selected in ascending order of representative metrics at the beginning of each stage, and symbol candidates are selected from the δ surviving paths. In the q-th repetition of the loop, symbol candidates are selected from surviving paths with the smallest representative metric that do not include δ−1 surviving paths that have already been selected. That is, cumulative metrics are calculated by delaying candidates whose representative cumulative metrics are the smallest. Before the calculation of the representative metric of one candidate is completed, the calculation of the metric of another candidate is started. This method makes it possible to calculate the cumulative metric of a symbol candidate by repeating calculations q+δ times, and thereby makes it possible to increase the processing speed.

The present invention is not limited to the specifically disclosed embodiments, and variations and modifications may be made without departing from the scope of the present invention. Although functional block diagrams are used to describe apparatuses in the above embodiment, the apparatuses may be implemented by hardware, software, or a combination of them.

A MIMO demodulation process is described above by way of embodiments. However, the present invention is not limited to the specifically disclosed embodiments, and variations and modifications may be made without departing from the scope of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio communication apparatus, comprising:
    a plurality of antennas;
    a receiver configured to receive, via the antennas, signals transmitted from a transmitter including a plurality of antennas; and
    a baseband processor configured to obtain channel estimates based on the received signals and perform signal detection based on the channel estimates according to a QRM-MLD (maximum likelihood detection employing QR decomposition and M-algorithm) method,
    wherein the baseband processor includes a stream separator configured to perform processes in a plurality of stages for the signal detection;
    wherein in a first stage, the stream separator detects a region to which a signal belongs, selects symbol candidates based on the detected region, and calculates metrics for the selected symbol candidates;
    wherein in a second stage, the stream separator selects symbol candidates based on the metrics calculated for the symbol candidates selected in the first stage; and
    wherein after starting calculation of the metrics for the symbol candidates selected in a previous repetition of a stage and before completing the calculation, the stream separator starts selecting symbol candidates for a next repetition of the stage based on metrics of surviving paths to which the symbol candidates whose metrics have been calculated belong.

2. The radio communication apparatus as claimed in claim 1, wherein the stream separator is configured to select a predetermined number of top symbol candidates in ascending order of the metrics for the next repetition of the stage.

3. The radio communication apparatus as claimed in claim 2, wherein when the stream separator is configured to pipeline processes for one or more resource elements, the predetermined number is determined based on a number of the resource elements whose processes are pipelined.

4. The radio communication apparatus as claimed in claim 1, wherein in each stage, the stream separator is configured to detect a region of a signal obtained by cancelling received symbol replicas in the surviving paths from a row component in a unitary transformation vector and select a predetermined number of symbol candidates based on a distance between a center of the region and the symbol candidates.

5. The radio communication apparatus as claimed in claim 1, wherein the stream separator is configured to select symbol candidates for the next repetition of the stage such that a number of the selected symbol candidates matches a number of surviving paths corresponding to the selected symbol candidates.

6. The radio communication apparatus as claimed in claim 1, wherein a number of symbol candidates selected by the stream separator is determined based on a number of symbol candidates whose metrics are calculated by pipelining processes.

7. The radio communication apparatus as claimed in claim 1, wherein the metrics are represented by squared Euclidean distances.

8. The radio communication apparatus as claimed in claim 1, wherein the stream separator is configured to pipeline processes of one or more resource elements.

9. A method performed by a radio communication apparatus including a plurality of antennas, the method comprising:
    receiving, via the antennas, signals transmitted from a transmitter including a plurality of antennas;
    obtaining channel estimates based on the received signals; and performing signal detection based on the channel estimates according to a QRM-MLD (maximum likelihood detection employing QR decomposition and M-algorithm) method through a plurality of stages, wherein in a first stage, a region to which a signal belongs is detected, symbol candidates are selected based on the detected region, and metrics are calculated for the selected symbol candidates;

wherein in a second stage, symbol candidates are selected based on the metrics calculated for the symbol candidates selected in the first stage; and wherein after calculation of the metrics for the symbol candidates selected in a previous repetition of a stage is started and before the calculation is completed, selection of symbol candidates for a next repetition of the stage is started and performed based on metrics of surviving paths to which the symbol candidates whose metrics have been calculated belong.

10. A baseband processor of a radio communication apparatus, the baseband processor comprising:

a stream separator configured to perform signal detection according to a QRM-MLD (maximum likelihood detection employing QR decomposition and M-algorithm) method based on channel estimates obtained based on received signals input from a receiver of the radio communication apparatus, wherein the stream separator is configured to perform processes in a plurality of stages for the signal detection;

wherein in a first stage, the stream separator detects a region to which a signal belongs, selects symbol candidates based on the detected region, and calculates metrics for the selected symbol candidates;

wherein in a second stage, the stream separator selects symbol candidates based on the metrics calculated for the symbol candidates selected in the first stage; and wherein after starting calculation of the metrics for the symbol candidates selected in a previous repetition of a stage and before completing the calculation, the stream separator starts selecting symbol candidates for a next repetition of the stage based on metrics of surviving paths to which the symbol candidates whose metrics have been calculated belong.

* * * * *